(12) United States Patent
Quan et al.

(10) Patent No.: US 10,575,288 B2
(45) Date of Patent: Feb. 25, 2020

(54) UPLINK INFORMATION SENDING METHOD AND APPARATUS

(71) Applicant: Huawei Technologies Co., Ltd., Shenzhen (CN)

(72) Inventors: Wei Quan, Beijing (CN); Jian Zhang, Beijing (CN); Bingzhao Li, Beijing (CN); Xun Tang, Beijing (CN); Xiaodong Yang, Shenzhen (CN); Jinhua Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/893,367

(22) Filed: Feb. 9, 2018

(65) Prior Publication Data
US 2018/0167936 A1 Jun. 14, 2018

Related U.S. Application Data

(63) Continuation of application No. PCT/CN2015/086795, filed on Aug. 12, 2015.

(51) Int. Cl.
*H04W 72/04* (2009.01)
*H04L 1/18* (2006.01)

(52) U.S. Cl.
CPC ....... *H04W 72/0413* (2013.01); *H04L 1/1812* (2013.01); *H04W 72/0446* (2013.01)

(58) Field of Classification Search
CPC . H04W 56/00; H04W 56/0005; H04W 56/45; H04W 72/0446; H04W 74/08; H04W 74/0833; H04W 74/02; H04W 74/002; H04W 76/10

USPC ....................................................... 370/336
See application file for complete search history.

(56) References Cited

U.S. PATENT DOCUMENTS

| 9,380,601 | B2 * | 6/2016 | Jeong | H04W 74/0833 |
| 10,045,381 | B2 * | 8/2018 | Lee | H04L 1/1671 |
| 2007/0254656 | A1 | 11/2007 | Dalsgaard | |
| 2008/0310395 | A1 | 12/2008 | Kashima | |
| 2009/0279495 | A1 | 11/2009 | Yoo | |

(Continued)

FOREIGN PATENT DOCUMENTS

| CN | 101132618 A | 2/2008 |
| CN | 101473562 A | 7/2009 |

(Continued)

*Primary Examiner* — Phong La
(74) *Attorney, Agent, or Firm* — Slater Matsil, LLP

(57) ABSTRACT

An uplink information sending methods and apparatus are provided. A communication device includes a processor coupled to a non-transitory memory, where the non-transitory memory stores an execution instruction to be executed in the processor. The execution instruction when executed enables the communication device to determine scheduling information and timing advance information. The scheduling information is used to instruct user equipment to send uplink information, and the timing advance information is used to adjust a timing advance used when the user equipment sends the uplink information. The execution instruction when executed further enables the communication device to adjust the timing advance according to the timing advance information, and send the uplink information according to the scheduling information by using an adjusted timing advance.

16 Claims, 11 Drawing Sheets

(56) References Cited

U.S. PATENT DOCUMENTS

| | | |
|---|---|---|
| 2010/0080155 A1 | 4/2010 | Suzuki et al. |
| 2011/0051633 A1 | 3/2011 | Pan et al. |
| 2011/0243102 A1 | 10/2011 | Sebire et al. |
| 2012/0063448 A1 | 3/2012 | Cai et al. |
| 2012/0093102 A1 | 4/2012 | Zhang et al. |
| 2012/0099452 A1 | 4/2012 | Dai et al. |
| 2012/0182986 A1 | 7/2012 | Sebire |
| 2014/0079032 A1 | 3/2014 | Bergstrom et al. |
| 2014/0126520 A1* | 5/2014 | Quan ............... H04W 74/0866 370/329 |
| 2014/0177573 A1* | 6/2014 | Han ................. H04W 72/1242 370/329 |
| 2015/0043505 A1* | 2/2015 | Kim ..................... H04L 1/1861 370/329 |
| 2015/0223124 A1* | 8/2015 | Wang .................. H04W 24/08 455/436 |
| 2015/0326995 A1* | 11/2015 | Li ........................ H04W 74/08 370/329 |
| 2017/0265231 A1* | 9/2017 | Lee ....................... H04L 1/1671 |
| 2018/0041988 A1* | 2/2018 | Lee ........................... H04L 5/00 |

FOREIGN PATENT DOCUMENTS

| | | |
|---|---|---|
| CN | 101572577 A | 11/2009 |
| CN | 101772150 A | 7/2010 |
| CN | 101772180 A | 7/2010 |
| CN | 104270810 A | 1/2015 |
| EP | 1985037 B1 | 10/2008 |
| EP | 2408253 A1 | 1/2012 |
| EP | 2549822 A1 | 1/2013 |
| JP | 2009521894 A | 6/2009 |
| JP | 2010531568 A | 9/2010 |
| JP | 2011508531 A | 3/2011 |
| JP | 2011520376 A | 7/2011 |
| JP | 2012504377 A | 2/2012 |
| JP | 2012528495 A | 11/2012 |
| JP | 2013506365 A | 2/2013 |
| WO | 2010075778 A1 | 7/2010 |

* cited by examiner

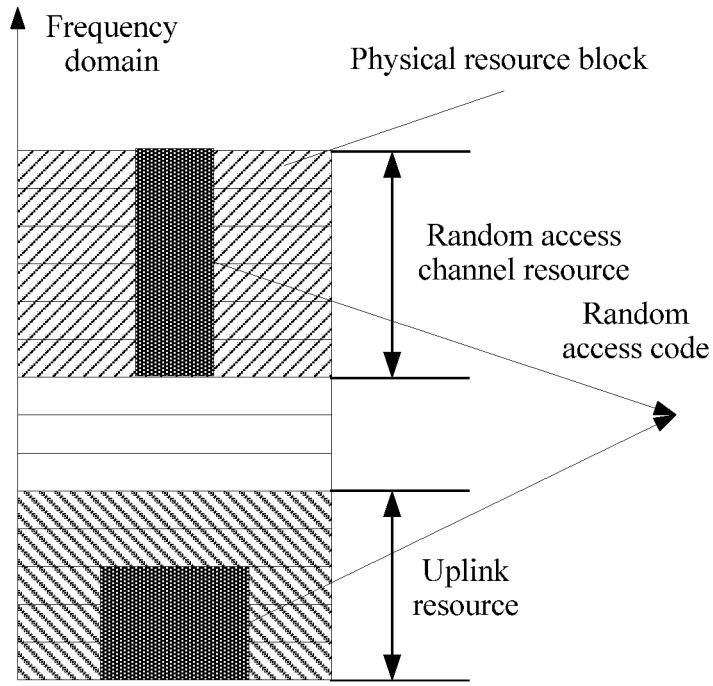

FIG. 7B

```
A network side device sends scheduling information, where the
scheduling information carries uplink resource information, the uplink     800
resource information is used to indicate a resource that can be used
when uplink information is sent, and the scheduling information is used
to instruct user equipment to send the uplink information
```

```
The network side device receives a random access code, where     810
the random access code is sent according to an uplink resource
```

```
The network side device sends a random access response     820
according to the random access code
```

FIG. 8

UPLINK INFORMATION SENDING METHOD AND APPARATUS

CROSS-REFERENCE TO RELATED APPLICATIONS

This application is a continuation of International Application No. PCT/CN2015/086795, filed on Aug. 12, 2015, the disclosure of which is hereby incorporated by reference in its entirety.

TECHNICAL FIELD

The present invention relates to the field of communications technologies, and in particular, to methods and apparatus for sending uplink information.

BACKGROUND

In the prior art, when UE (user equipment) is in an RRC (radio resource control) connected state, after the UE is out of uplink synchronization, the UE releases an allocated uplink resource, for example, a PUCCH (physical uplink control channel) resource, an SRS (sounding reference signal) resource, or a semi-static PUSCH (physical uplink shared channel) resource. After the UE is out of uplink synchronization, the UE does not send any other information to a network side except a random access code. For example, the UE does not send uplink data. For another example, even if the UE receives downlink data sent by the network side, the UE does not perform uplink HARQ (hybrid automatic repeat request) feedback of the downlink data.

After the UE is out of uplink synchronization, if the UE needs to send uplink data or perform uplink HARQ feedback, the UE first needs to perform a random access process to implement uplink synchronization. Then, after implementing uplink synchronization, the UE sends the uplink data or performs uplink HARQ feedback.

For example, when uplink data arrives at the UE, because the UE is out of uplink synchronization and cannot perform uplink sending, the UE performs random access. After completing random access, the UE implements uplink synchronization, and then can send the uplink data. Likewise, after downlink data arrives at the network side, because the UE is out of uplink synchronization and cannot perform uplink sending, that is, cannot perform feedback on the downlink data, the network side triggers the UE to perform random access. After completing random access, the UE implements uplink synchronization. A network side device sends downlink data to the UE, and the UE performs uplink HARQ feedback on the received downlink data.

However, the relatively complex uplink synchronization process used by the UE in such conventional designs introduces relatively long delays and results in relatively low efficiency when uplink data is sent or an uplink HARQ feedback of downlink data is sent.

SUMMARY

Embodiments of the present invention provide an uplink information sending method and apparatus, so as to reduce the long delay and low efficiency of conventional methods of sending uplink data or sending an uplink HARQ feedback of downlink data.

According to a first aspect, a communication device includes a processor coupled to a non-transitory memory, where the non-transitory memory stores an execution instruction to be executed in the processor. The execution instruction when executed enables the communication device to determine scheduling information and timing advance information. The scheduling information is used to instruct user equipment to send uplink information, and the timing advance information is used to adjust a timing advance used when the user equipment sends the uplink information. The execution instruction when executed further enables the communication device to adjust the timing advance according to the timing advance information, and send the uplink information according to the scheduling information by using an adjusted timing advance.

With reference to the first aspect, in a first possible implementation, the determining includes determining the scheduling information and the timing advance information at a first transmission time interval TTI.

With reference to the first possible implementation of the first aspect, in a second possible implementation, the execution instructions further enable the device to send the uplink information according to the scheduling information by using the adjusted timing advance at a second TTI, where the second TTI and the first TTI are separated by N TTIs, and N is greater than or equal to 0.

With reference to the first aspect, and the first to the second possible implementations of the first aspect, in a third possible implementation, the execution instructions further enables the device to determine the timing advance.

With reference to the first aspect, and the first to third possible implementations of the first aspect, in a fourth possible implementation, the execution instructions further enable the device to receive a Media Access Control MAC control element CE or physical layer control signaling; and that a determining module determines timing advance information is specifically: the determining module obtains the timing advance information from the MAC CE; or the user equipment obtains the timing advance information from the physical layer control signaling.

With reference to the first aspect, and the first to fourth possible implementations of the first aspect, in a fifth possible implementation, the user equipment further includes instructions to receive physical layer control signaling; and where the instructions for determining include instructions for obtaining the scheduling information from the physical layer control signaling.

With reference to the first aspect, and the first to the fifth possible implementations of the first aspect, in a sixth possible implementation, the uplink information includes uplink data and/or uplink hybrid automatic repeat request HARQ feedback information.

With reference to the first aspect, and the first to the sixth possible implementations of the first aspect, in a seventh possible implementation, the uplink information includes the uplink HARQ feedback information; the instructions for enabling the determining are further configured to determine a feedback resource that can be used when the uplink HARQ feedback information is sent; and the instructions for enabling the sending comprise instructions for sending the uplink information on the feedback resource according to the scheduling information by using the adjusted timing advance.

With reference to the seventh possible implementation of the first aspect, in an eighth possible implementation, the execution instructions that enable the device to determine the feedback resource comprise instructions for determining resource configuration information and uses a resource corresponding to the resource configuration information as the feedback resource.

With reference to the eighth possible implementation of the first aspect, in a ninth possible implementation, the resource configuration information includes at least one of time domain information, frequency domain information, or code domain information.

With reference to the first aspect, and the first to the ninth possible implementations of the first aspect, in a tenth possible implementation, the user equipment further includes instructions that enable the user equipment to receive a timing advance adjustment indication, where the timing advance adjustment indication is used to indicate that the user equipment can adjust the timing advance according to the timing advance information.

With reference to the first aspect, and the first to the tenth possible implementations of the first aspect, in an eleventh possible implementation, the instructions that enable the user equipment to determine comprise instructions for determining that the user equipment is in an out-of-synchronization state.

According to a second aspect, a network side device includes a processor coupled to a non-transitory memory, where the non-transitory memory stores an execution instruction to be executed in the processor. The execution instruction when executed enables the network device to send scheduling information and timing advance information, where the scheduling information is used to instruct user equipment to send uplink information, and the timing advance information is used to adjust a timing advance used when the user equipment sends the uplink information. The execution instruction when executed further enables the network device to receive the uplink information, where the uplink information is sent according to the scheduling information and the timing advance information.

With reference to the second aspect, in a first possible implementation, the execution instruction that enables the sending comprise instructions for sending the scheduling information and the timing advance information at a first transmission time interval TTI.

With reference to the first possible implementation of the second aspect, in a second possible implementation, the execution instruction that enables the receiving comprise instructions for receiving the uplink information at a second TTI, where the second TTI and the first TTI are separated by N TTIs, and N is greater than or equal to 0.

With reference to the second aspect, and the first to the second possible implementations of the second aspect, in a third possible implementation, the execution instruction that enables the sending is further configured to send the timing advance.

With reference to the second aspect, and the first to the third possible implementations of the second aspect, in a fourth possible implementation, the execution instruction that enables the sending sends a Media Access Control MAC control element CE, where the MAC CE carries the timing advance information. Alternately, the execution instruction that enables the sending sends physical layer control signaling, where the physical layer control signaling carries the timing advance information.

With reference to the second aspect, and the first to the fourth possible implementations of the second aspect, in a fifth possible implementation, the execution instruction that enables the sending sends physical layer control signaling, where the physical layer control signaling carries the scheduling information.

With reference to the second aspect, and the first to the fifth possible implementations of the second aspect, in a sixth possible implementation, the uplink information includes uplink data and/or uplink hybrid automatic repeat request HARQ feedback information.

With reference to the second aspect, and the first to the sixth possible implementations of the second aspect, in a seventh possible implementation, the uplink information includes the uplink HARQ feedback information; and the execution instruction that enables the sending is further configured to send resource configuration information, where a resource corresponding to the resource configuration information is a feedback resource, and the feedback resource is a resource that can be used when the uplink HARQ feedback information is sent.

With reference to the seventh possible implementation of the second aspect, in an eighth possible implementation, the resource configuration information includes at least one of time domain information, frequency domain information, or code domain information.

With reference to the second aspect, and the first to the eighth possible implementations of the second aspect, in a ninth possible implementation, the execution instruction that enables the sending is further configured to send an uplink timing advance adjustment indication, where the timing advance adjustment indication is used to indicate that the user equipment can adjust the timing advance according to the timing advance information.

According to a third aspect, user equipment is provided, including: a receiving module, configured to receive scheduling information, where the scheduling information carries uplink resource information, the uplink resource information is used to indicate a resource that can be used when uplink information is sent, and the scheduling information is used to instruct the user equipment to send the uplink information; a determining module, configured to determine that the user equipment is in an out-of-synchronization state; and a sending module, configured to: when the determining module determines that the user equipment is in an out-of-synchronization state, send a random access code by using the uplink resource, where the receiving module is further configured to receive a random access response, where the random access response is sent according to the random access code.

With reference to the third aspect, in a first possible implementation, that a sending module sends a random access code by using the uplink resource is specifically: the sending module sends the random access code by using at least one target physical resource block, where the target physical resource block is a physical resource block that is in the resource and whose frequency domain location is lower than a first frequency domain location that is used as a preset threshold or whose number is less than a first number that is used as a preset threshold; or the target physical resource block is a physical resource block that is in the resource and whose frequency domain location is higher than a second frequency domain location that is used as a preset threshold or whose number is greater than a second number that is used as a preset threshold; or the target physical resource block is preset.

With reference to the third aspect and the first possible implementation of the third aspect, in a second possible implementation, the determining module is further configured to determine random access resource information, where the random access resource information includes at least one random access code.

With reference to the second possible implementation of the third aspect, in a third possible implementation, the at least one random access code belongs to a same group; and that a sending module sends a random access code by using the uplink resource is specifically: the sending module selects one of the at least one random access code and sends the selected random access code by using the uplink resource.

With reference to the second or the third possible implementation of the third aspect, in a fourth possible implementation, the at least one random access code includes at least one dedicated random access code; and that a sending module sends a random access code by using the uplink resource is specifically: the sending module selects one of the at least one dedicated random access code and sends the selected dedicated random access code by using the uplink resource.

With reference to the third aspect, and the first to the fourth possible implementations of the third aspect, in a fifth possible implementation, the random access resource information includes random access channel resource information; and the sending module is further configured to: when the determining module determines that the user equipment is in an out-of-synchronization state, send a random access code by using a random access channel resource, where the random access channel resource is a channel resource indicated by the random access channel resource information.

With reference to the fifth possible implementation of the third aspect, in a sixth possible implementation, that the sending module sends a random access code by using a random access channel resource is specifically: the sending module sends the random access code by using a random access channel resource of a TTI at which the uplink resource is located; and/or the sending module sends the random access code by using the uplink resource; and/or the sending module sends the random access code by using a random access channel resource of a TTI following a TTI at which the uplink resource is located.

With reference to the fifth or the sixth possible implementation of the third aspect, in a seventh possible implementation, the random access channel resource information is time-frequency information and/or frequency domain location information of a random access channel, or information for indicating time-frequency information and/or frequency domain location information of a random access channel.

With reference to the third aspect, and the first to the seventh possible implementations of the third aspect, in an eighth possible implementation, the sending module is further configured to send the uplink information according to the random access response.

According to a fourth aspect, a network side device is provided, including: a sending module, configured to send scheduling information, where the scheduling information carries uplink resource information, the uplink resource information is used to indicate a resource that can be used when uplink information is sent, and the scheduling information is used to instruct user equipment to send the uplink information; and a receiving module, configured to receive a random access code, where the random access code is sent according to an uplink resource, where the sending module is further configured to send a random access response according to the random access code.

With reference to the fourth aspect, in a first possible implementation, the sending module is further configured to send random access resource information, where the random access resource information includes at least one random access code.

With reference to the first possible implementation of the fourth aspect, in a second possible implementation, the at least one random access code belongs to a same group; and that a receiving module receives a random access code is specifically: the receiving module receives one of the at least one random access code.

With reference to the first or the second possible implementation of the fourth aspect, in a third possible implementation, the at least one random access code includes at least one dedicated random access code; and that a receiving module receives a random access code is specifically: the receiving module receives one of the at least one dedicated random access code.

With reference to the fourth aspect, and the first to the third possible implementations of the fourth aspect, in a fourth possible implementation, the random access resource information includes random access channel resource information.

With reference to the fourth possible implementation of the fourth aspect, in a fifth possible implementation, the random access channel resource information is time-frequency information and/or frequency domain location information of a random access channel, or information for indicating time-frequency information and/or frequency domain location information of a random access channel.

With reference to the fourth aspect, and the first to the fifth possible implementations of the fourth aspect, in a sixth possible implementation, the receiving module is further configured to receive the uplink information.

According to a fifth aspect, an uplink information sending method is provided, including: determining, by user equipment, scheduling information and timing advance information, where the scheduling information is used to instruct the user equipment to send uplink information, and the timing advance information is used to adjust a timing advance used when the user equipment sends the uplink information; adjusting, by the user equipment, the timing advance according to the timing advance information; and sending, by the user equipment, the uplink information according to the scheduling information by using an adjusted timing advance.

With reference to the fifth aspect, in a first possible implementation, the determining, by user equipment, scheduling information and timing advance information includes: determining, by the user equipment, the scheduling information and the timing advance information at a first transmission time interval TTI.

With reference to the first possible implementation of the fifth aspect, in a second possible implementation, the sending, by the user equipment, the uplink information according to the scheduling information by using an adjusted timing advance includes: sending, by the user equipment, the uplink information according to the scheduling information by using the adjusted timing advance at a second TTI, where the second TTI and the first TTI are separated by N TTIs, and N is greater than or equal to 0.

With reference to the fifth aspect, and the first to the second possible implementations of the fifth aspect, in a third possible implementation, before the adjusting, by the user equipment, the timing advance according to the timing advance information, the method further includes: determining, by the user equipment, the timing advance.

With reference to the fifth aspect or the first to the third possible implementations of the fifth aspect, in a fourth possible implementation, the determining, by user equipment, timing advance information includes: receiving, by the user equipment, a Media Access Control MAC control element CE, and obtaining the timing advance information from the MAC CE; or receiving, by the user equipment, physical layer control signaling, and obtaining the timing advance information from the physical layer control signaling.

With reference to the fifth aspect, and the first to the fourth possible implementations of the fifth aspect, in a fifth possible implementation, the determining, by user equipment, scheduling information includes: receiving, by the user equipment, physical layer control signaling, and obtaining the scheduling information from the physical layer control signaling.

With reference to the fifth aspect, and the first to the fifth possible implementations of the fifth aspect, in a sixth possible implementation, the uplink information includes uplink data and/or uplink hybrid automatic repeat request HARQ feedback information.

With reference to the fifth aspect, and the first to the sixth possible implementations of the fifth aspect, in a seventh possible implementation, the uplink information includes the uplink HARQ feedback information; before the sending, by the user equipment, the uplink information, the method further includes: determining, by the user equipment, a feedback resource that can be used when the uplink HARQ feedback information is sent; and the sending, by the user equipment, the uplink information according to the scheduling information by using an adjusted timing advance includes: sending, by the user equipment, the uplink information on the feedback resource according to the scheduling information by using the adjusted timing advance.

With reference to the seventh possible implementation of the fifth aspect, in an eighth possible implementation, the determining, by the user equipment, a feedback resource that can be used when the uplink HARQ feedback information is sent includes: determining, by the user equipment, resource configuration information and using a resource corresponding to the resource configuration information as the feedback resource.

With reference to the eighth possible implementation of the fifth aspect, in a ninth possible implementation, the resource configuration information includes at least one of time domain information, frequency domain information, or code domain information.

With reference the fifth aspect, and the first to the ninth possible implementations of the fifth aspect, in a tenth possible implementation, before the sending, by the user equipment, the uplink information according to the scheduling information by using an adjusted timing advance, the method further includes: receiving, by the user equipment, a timing advance adjustment indication, where the timing advance adjustment indication is used to indicate that the user equipment can adjust the timing advance according to the timing advance information.

With reference to the fifth aspect, and the first to the tenth possible implementations of the fifth aspect, in an eleventh possible implementation, before the determining, by the user equipment, the timing advance, the method further includes: determining, by the user equipment, that the user equipment is in an out-of-synchronization state.

According to a sixth aspect, an uplink information sending method is provided, including: sending, by a network side device, scheduling information and timing advance information, where the scheduling information is used to instruct user equipment to send uplink information, and the timing advance information is used to adjust a timing advance used when the user equipment sends the uplink information; and receiving, by the network side device, the uplink information, where the uplink information is sent according to the scheduling information and the timing advance information.

With reference to the sixth aspect, in a first possible implementation, the sending, by a network side device, scheduling information and timing advance information includes: sending, by the network side device, the scheduling information and the timing advance information at a first transmission time interval TTI.

With reference to the first possible implementation of the sixth aspect, in a second possible implementation, the receiving, by the network side device, the uplink information includes: receiving, by the network side device, the uplink information at a second TTI, where the second TTI and the first TTI are separated by N TTIs, and N is greater than or equal to 0.

With reference to the sixth aspect, and the first to the second possible implementations of the sixth aspect, in a third possible implementation, before the receiving, by the network side device, the uplink information, the method further includes: sending, by the network side device, the timing advance.

With reference to the sixth aspect, and the first to the third possible implementations of the sixth aspect, in a fourth possible implementation, the sending, by a network side device, timing advance information includes: sending, by the network side device, a Media Access Control MAC control element CE, where the MAC CE carries the timing advance information; or sending, by the network side device, physical layer control signaling, where the physical layer control signaling carries the timing advance information.

With reference to the sixth aspect, and the first to the fourth possible implementations of the sixth aspect, in a fifth possible implementation, the sending, by a network side device, scheduling information includes: sending, by the network side device, physical layer control signaling, where the physical layer control signaling carries the scheduling information.

With reference to the sixth aspect, and the first to the fifth possible implementations of the sixth aspect, in a sixth possible implementation, the uplink information includes uplink data and/or uplink hybrid automatic repeat request HARQ feedback information.

With reference to the sixth aspect, and the first to the sixth possible implementations of the sixth aspect, in a seventh possible implementation, the uplink information includes the uplink HARQ feedback information; and before the receiving, by the network side device, the uplink information, the method further includes: sending, by the network side device, resource configuration information, where a resource corresponding to the resource configuration information is a feedback resource, and the feedback resource is a resource that can be used when the uplink HARQ feedback information is sent.

With reference to the seventh possible implementation of the sixth aspect, in an eighth possible implementation, the resource configuration information includes at least one of time domain information, frequency domain information, or code domain information.

With reference to the sixth aspect, and the first to the eighth possible implementations of the sixth aspect, in a ninth possible implementation, before the receiving, by the network side device, the uplink information, the method further includes: sending, by the network side device, an uplink timing advance adjustment indication, where the timing advance adjustment indication is used to indicate that the user equipment can adjust the timing advance according to the timing advance information.

According to a seventh aspect, a random access method is provided, including: receiving, by user equipment, scheduling information, where the scheduling information carries uplink resource information, the uplink resource information is used to indicate a resource that can be used when uplink information is sent, and the scheduling information is used to instruct the user equipment to send the uplink information; when determining that the user equipment is in an out-of-synchronization state, sending, by the user equipment, a random access code by using the uplink resource; and receiving, by the user equipment, a random access response, where the random access response is sent according to the random access code.

With reference to the seventh aspect, in a first possible implementation, the sending, by the user equipment, a random access code by using the uplink resource includes: sending, by the user equipment, the random access code by using at least one target physical resource block, where the target physical resource block is a physical resource block that is in the resource and whose frequency domain location is lower than a first frequency domain location that is used as a preset threshold or whose number is less than a first number that is used as a preset threshold; or the target physical resource block is a physical resource block that is in the resource and whose frequency domain location is higher than a second frequency domain location that is used as a preset threshold or whose number is greater than a second number that is used as a preset threshold; or the target physical resource block is preset.

With reference to the seventh aspect and the first possible implementation of the seventh aspect, in a second possible implementation, before the sending, by the user equipment, a random access code by using the uplink resource, the method further includes: determining, by the user equipment, random access resource information, where the random access resource information includes at least one random access code.

With reference to the second possible implementation of the seventh aspect, in a third possible implementation, the at least one random access code belongs to a same group; and the sending, by the user equipment, a random access code by using the uplink resource includes: selecting, by the user equipment, one of the at least one random access code, and sending the selected random access code by using the uplink resource.

With reference to the second or the third possible implementation of the seventh aspect, in a fourth possible implementation, the at least one random access code includes at least one dedicated random access code; and the sending, by the user equipment, a random access code by using the uplink resource includes: selecting, by the user equipment, one of the at least one dedicated random access code, and sending the selected dedicated random access code by using the uplink resource.

With reference to the seventh aspect, and the first to the fourth possible implementations of the seventh aspect, in a fifth possible implementation, the random access resource information includes random access channel resource information; and the method further includes: when determining that the user equipment is in an out-of-synchronization state, sending, by the user equipment, a random access code by using a random access channel resource, where the random access channel resource is a channel resource indicated by the random access channel resource information.

With reference to the fifth possible implementation of the seventh aspect, in a sixth possible implementation, the sending, by the user equipment, a random access code by using a random access channel resource includes: sending, by the user equipment, the random access code by using a random access channel resource of a TTI at which the uplink resource is located; and/or sending, by the user equipment, the random access code by using the uplink resource; and/or sending, by the user equipment, the random access code by using a random access channel resource of a TTI following a TTI at which the uplink resource is located.

With reference to the fifth or the sixth possible implementation of the seventh aspect, in a seventh possible implementation, the random access channel resource information is time-frequency information and/or frequency domain location information of a random access channel, or information for indicating time-frequency information and/or frequency domain location information of a random access channel.

With reference to the seventh aspect, and the first to the seventh possible implementations of the seventh aspect, in an eighth possible implementation, after the receiving, by the user equipment, a random access response, the method further includes: sending, by the user equipment, the uplink information according to the random access response.

According to an eighth aspect, a random access method is provided, including: sending, by a network side device, scheduling information, where the scheduling information carries uplink resource information, the uplink resource information is used to indicate a resource that can be used when uplink information is sent, and the scheduling information is used to instruct user equipment to send the uplink information; receiving, by the network side device, a random access code, where the random access code is sent according to an uplink resource; and sending, by the network side device, a random access response according to the random access code.

With reference to the eighth aspect, in a first possible implementation, before the receiving, by the network side device, a random access code, the method further includes: sending, by the network side device, random access resource information, where the random access resource information includes at least one random access code.

With reference to the first possible implementation of the eighth aspect, in a second possible implementation, the at least one random access code belongs to a same group; and the receiving, by the network side device, a random access code includes: receiving, by the network side device, one of the at least one random access code.

With reference to the first or the second possible implementation of the eighth aspect, in a third possible implementation, the at least one random access code includes at least one dedicated random access code; and the receiving, by the network side device, a random access code includes: receiving, by the network side device, one of the at least one dedicated random access code.

With reference to the eighth aspect, and the first to the third possible implementations of the eighth aspect, in a fourth possible implementation, the random access resource information includes random access channel resource information.

With reference to the fourth possible implementation of the eighth aspect, in a fifth possible implementation, the random access channel resource information is time-frequency information and/or frequency domain location information of a random access channel, or information for indicating time-frequency information and/or frequency domain location information of a random access channel.

With reference to the eighth aspect, and the first to the fifth possible implementations of the eighth aspect, in a sixth possible implementation, after the sending, by the network side device, a random access response according to the random access code, the method further includes: receiving, by the network side device, the uplink information.

The embodiments of the present invention provide the uplink information sending method, and the method includes: determining, by the user equipment, the scheduling information and the timing advance information, where the scheduling information is used to instruct the user equipment to send the uplink information, and the timing advance information is used to adjust the timing advance used when the user equipment sends the uplink information; adjusting, by the user equipment, the timing advance according to the timing advance information; and sending, by the user equipment, the uplink information according to the scheduling information by using the adjusted timing advance. In the prior art, when the user equipment is out of uplink synchronization, the user equipment can implement uplink synchronization only by using a random access process. When performing the random access process, the user equipment needs to send the random access code to the network side device, and then the network side device returns the timing advance information to the user equipment. However, in this implementation, the user equipment can implement uplink synchronization without using the random access process, that is, the user equipment can determine the timing advance information without sending the random access code, and then the user equipment can implement uplink synchronization according to the timing advance information. In this way, prior-art disadvantages of a long delay and low efficiency of sending uplink data or sending an uplink HARQ feedback of downlink data are overcome.

BRIEF DESCRIPTION OF THE DRAWINGS

FIG. 7B is a schematic diagram of a random access channel resource according to an embodiment of the present invention;

FIG. 8 is another schematic flowchart of random access according to an embodiment of the present invention;

DETAILED DESCRIPTION OF ILLUSTRATIVE EMBODIMENTS

To make the objectives, technical implementations, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the following, some implementations of the present invention are described in detail with reference to the accompanying drawings. It should be understood that some embodiments described herein are merely used to illustrate and explain the present invention, but are not intended to limit the present invention. In addition, the embodiments of this application and features in the embodiments may be mutually combined in an implementation in which they do not conflict with each other.

Figure 1A:
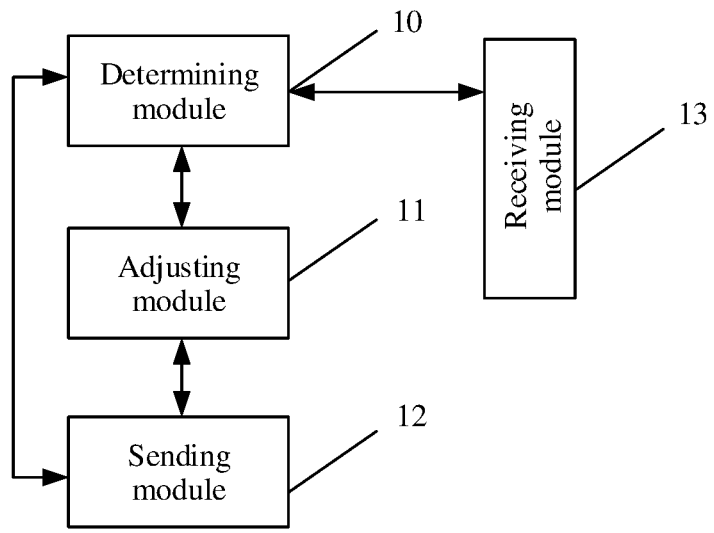
FIG. 1A is a schematic diagram of user equipment according to an embodiment of the present invention.

Referring to FIG. 1A, user equipment is provided, and the user equipment includes a determining module 10, an adjustment module 11, and a sending module 12.

The determining module 10 is configured to determine scheduling information and timing advance information, where the scheduling information is used to instruct the user equipment to send uplink information, and the timing advance information is used to adjust a timing advance used when the user equipment sends the uplink information.

The adjustment module 11 is configured to adjust the timing advance according to the timing advance information.

The sending module 12 is configured to send the uplink information according to the scheduling information by using an adjusted timing advance.

In this embodiment, the user equipment can implement uplink synchronization without using a random access process, that is, the user equipment can determine the timing advance information without sending a random access code, thereby reducing interaction of a random access code between the user equipment and a network side device. This overcomes prior-art disadvantages of a long delay and low efficiency of sending uplink data or sending an uplink HARQ feedback of downlink data.

Optionally, the determining module 10 determines the scheduling information and the timing advance information at a first TTI (transmission time interval). Optionally, the sending module 12 sends the uplink information according to the scheduling information by using the adjusted timing advance at a second TTI. The second TTI and the first TTI are separated by N TTIs, and N is greater than or equal to 0.

When sending the uplink information according to the scheduling command, the user equipment can send the uplink information by using the adjusted timing advance at the second TTI. Therefore, the user equipment is synchronized with the network side device, so that a network side can accurately receive the uplink information sent by the user equipment.

Because the timing advance information is used to adjust the timing advance, the determining module 10 is further configured to determine the timing advance. The determined timing advance information is meaningful in this implementation. If the timing advance is not determined, determining the timing advance information is meaningless.

Further, the user equipment further includes a receiving module 13, configured to receive a MAC (Media Access Control) CE (control element) or physical layer control signaling.

In this implementation, the determining module 10 obtains the timing advance information from the MAC CE. Alternately, the user equipment obtains the timing advance information from the physical layer control signaling.

Because the MAC CE includes a 6-bit adjustment value, to avoid resource waste, the MAC CE may carry the timing advance information.

The user equipment further includes the receiving module 13 configured to receive physical layer control signaling. In one embodiment, the determining module 10 obtains the scheduling information from the physical layer control signaling. Optionally, the uplink information includes uplink data and/or uplink HARQ (hybrid automatic repeat request) feedback information. That is, the uplink information may be uplink data.

Alternatively, when downlink data is received, uplink HARQ feedback is performed on the downlink data, and the uplink information may be uplink HARQ feedback information in this implementation. The uplink information includes the uplink HARQ feedback information in one or more embodiments.

In the prior art, after receiving downlink data at a current TTI, the user equipment usually performs uplink HARQ feedback on the received downlink data at a fourth TTI following the current TTI. A feedback resource used for performing uplink HARQ feedback is usually obtained according to a location of a resource occupied by the scheduling command. However, when sending uplink HARQ feedback information at a sixth TTI following the current TTI, the user equipment may conflict with another user equipment over a feedback resource used at an $(N+6)^{th}$ TTI and determined at an $(N+2)^{th}$ TTI. Therefore, to avoid a conflict over the feedback resource, the determining module 10 is further configured to determine a feedback resource that can be used when the uplink HARQ feedback information is sent.

In one embodiment, the sending module 12 sends the uplink information on the feedback resource according to the scheduling information by using the adjusted timing advance. In this implementation, because the user equipment can predetermine the feedback resource, different user equipments do not occupy a same feedback resource, thereby avoiding a resource conflict.

Optionally, in another embodiment, the determining module 10 determines resource configuration information and uses a resource corresponding to the resource configuration information as the feedback resource.

Optionally, in a further embodiment, the resource configuration information includes at least one of time domain information, frequency domain information, or code domain information.

In order that the user equipment can flexibly choose to implement uplink synchronization by using this embodiment or by using the random access process, the user equipment further includes the receiving module 13, configured to receive a timing advance adjustment indication. The timing advance adjustment indication is used to indicate that the user equipment can adjust the timing advance according to the timing advance information.

That is, a function of implementing uplink synchronization according to this embodiment is enabled only after the receiving module 13 receives the timing advance adjustment indication. If the receiving module 13 does not receive the timing advance adjustment indication, uplink synchronization can be implemented only by using the random access process.

In one embodiment, this implementation is described on the premise of a scenario in which the user equipment is in an out-of-synchronization state, that is, this implementation is meaningful only in this scenario. If the user equipment is in a synchronized state, the network side device can accurately receive the uplink information of the user equipment without using the timing advance or even the timing advance information. Therefore, the determining module 10 is further configured to determine that the user equipment is in an out-of-synchronization state.

Figure 1B:
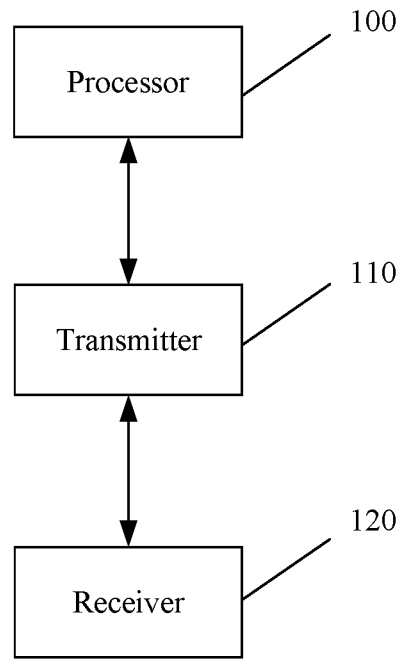
FIG. 1B is another schematic diagram of user equipment according to an embodiment of the present invention.

Referring to FIG. 1B, an embodiment of the present invention provides user equipment, which includes a processor 100 and a transmitter no.

The processor 100 is configured to determine scheduling information and timing advance information. The scheduling information is used to instruct the user equipment to send uplink information, and the timing advance information is used to adjust a timing advance used when the user equipment sends the uplink information.

The processor 100 is further configured to adjust the timing advance according to the timing advance information. The transmitter no is configured to send the uplink information according to the scheduling information by using an adjusted timing advance.

In this implementation, the user equipment can implement uplink synchronization without using a random access process, that is, the user equipment can determine the timing advance information without sending a random access code, thereby reducing interaction of a random access code between the user equipment and a network side device. This overcomes prior-art disadvantages of a long delay and low efficiency of sending uplink data or sending an uplink HARQ feedback of downlink data.

Optionally, in one embodiment, the processor 100 determines the scheduling information and the timing advance information at a first TTI (transmission time interval). Optionally, in a further embodiment, the transmitter no sends the uplink information according to the scheduling information by using the adjusted timing advance at a second TTI. The second TTI and the first TTI are separated by N TTIs, and N is greater than or equal to 0.

When sending the uplink information according to the scheduling command, the user equipment can send the uplink information by using the adjusted timing advance at the second TTI. Therefore, the user equipment is synchronized with the network side device, so that a network side can accurately receive the uplink information sent by the user equipment.

Because the timing advance information is used to adjust the timing advance, the processor 100 is further configured to determine the timing advance. The determined timing advance information is meaningful in this implementation. If the timing advance is not determined, determining the timing advance information is meaningless.

Further, the user equipment further includes a receiver 120, configured to receive a MAC (Media Access Control) CE (control element) or physical layer control signaling. In this implementation, the processor 100 obtains the timing advance information from the MAC CE; or the user equipment obtains the timing advance information from the physical layer control signaling. Because the MAC CE includes a 6-bit adjustment value, to avoid resource waste, the MAC CE may carry the timing advance information.

The user equipment further includes the receiver 120, configured to receive physical layer control signaling. The processor 100 obtains the scheduling information from the physical layer control signaling.

Optionally, in one embodiment, the uplink information includes uplink data and/or uplink HARQ (hybrid automatic repeat request) feedback information. That is, the uplink information may be uplink data. Alternatively, when downlink data is received, uplink HARQ feedback is performed on the downlink data, and the uplink information may be uplink HARQ feedback information in this implementation. The uplink information includes the uplink HARQ feedback information.

In the prior art, after receiving downlink data at a current TTI, the user equipment performs uplink HARQ feedback on the received downlink data at a fourth TTI following the current TTI. A feedback resource used for performing uplink HARQ feedback is obtained according to a location of a resource occupied by the scheduling command. However, when sending uplink HARQ feedback information at a sixth TTI following the current TTI, the user equipment may conflict with another user equipment over a feedback resource used at an $(N+6)^{th}$ TTI and determined at an $(N+2)^{th}$ TTI. Therefore, to avoid a conflict over the feedback resource, the processor 100 is further configured to determine a feedback resource that can be used when the uplink HARQ feedback information is sent.

The transmitter no sends the uplink information on the feedback resource according to the scheduling information by using the adjusted timing advance. In this implementation, because the user equipment can predetermine the feedback resource, different user equipments do not occupy a same feedback resource, thereby avoiding a resource conflict.

Optionally, in one embodiment, the processor 100 determines resource configuration information and uses a resource corresponding to the resource configuration information as the feedback resource. Optionally, in a further embodiment, the resource configuration information includes at least one of time domain information, frequency domain information, or code domain information.

To enable the user equipment flexibility to implement uplink synchronization by using this implementation or by using the random access process, the user equipment further includes the receiver 120 configured to receive a timing advance adjustment indication. The timing advance adjustment indication is used to indicate that the user equipment can adjust the timing advance according to the timing advance information.

That is, a function of implementing uplink synchronization according to this implementation is enabled only after the receiver 120 receives the timing advance adjustment indication. If the receiver 120 does not receive the timing advance adjustment indication, uplink synchronization can be implemented only by using the random access process.

This implementation is described on the premise of a scenario in which the user equipment is in an out-of-synchronization state, that is, this implementation is meaningful only in this scenario. If the user equipment is in a synchronized state, the network side device can accurately receive the uplink information of the user equipment without using the timing advance or even the timing advance information. Therefore, the processor 100 is further configured to determine that the user equipment is in an out-of-synchronization state.

Figure 2A:
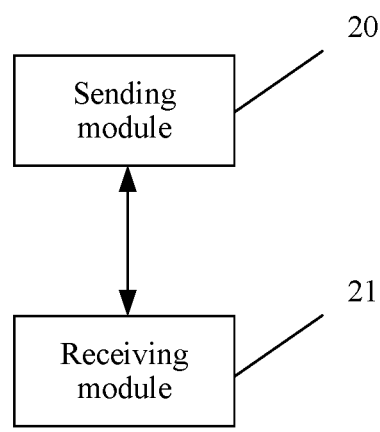
FIG. 2A is a schematic diagram of a network side device according to an embodiment of the present invention.

Referring to FIG. 2A, a network side device is provided, and the network side device includes a sending module 20 and a receiving module 21.

The sending module 20 is configured to send scheduling information and timing advance information, where the scheduling information is used to instruct user equipment to send uplink information, and the timing advance information is used to adjust a timing advance used when the user equipment sends the uplink information.

The receiving module 21 is configured to receive the uplink information, where the uplink information is sent according to the scheduling information and the timing advance information.

In this implementation, the user equipment can implement uplink synchronization without using a random access process, that is, the user equipment can determine the timing advance information without sending a random access code. That is, the network side device does not need to send the timing advance information to the user equipment only when receiving the random access code, but can send the timing advance information in real time or according to a specific period, thereby reducing interaction of a random access code between the user equipment and the network side device. This overcomes prior-art disadvantages of a long delay and low efficiency of sending uplink data or sending an uplink HARQ feedback of downlink data.

Optionally, in one embodiment, the sending module 20 sends the scheduling information and the timing advance information at a first transmission time interval TTI. Optionally, in a further embodiment, the receiving module 21 receives the uplink information at a second TTI. The second TTI and the first TTI are separated by N TTIs, and N is greater than or equal to 0.

When sending the uplink information according to the scheduling command, the user equipment can send the uplink information by using the adjusted timing advance at the second TTI, and the user equipment is synchronized with the network side device. In various embodiments, the second TTI and the first TTI may be separated by any quantity of TTIs. In this implementation, the network side device can accurately receive the uplink information sent by the user equipment. Therefore, accuracy of receiving the uplink information by the network side device is improved.

Because the timing advance information is used to adjust the timing advance, the sending module 20 is further configured to send the timing advance. The timing advance information determined by the user equipment is meaningful in this implementation. If the timing advance is not determined, determining the timing advance information is meaningless.

Further, in one embodiment, the sending module 20 sends a MAC CE, where the MAC CE carries the timing advance information. Alternately, in another embodiment, the sending module 20 sends physical layer control signaling, where the physical layer control signaling carries the timing advance information.

Because the MAC CE includes a 6-bit adjustment value, to avoid resource waste, preferably, the MAC CE may carry the timing advance information.

Optionally, in one embodiment, the sending module 20 sends physical layer control signaling, where the physical layer control signaling carries the scheduling information. Optionally, in a further embodiment, the uplink information includes uplink data and/or uplink HARQ feedback information. That is, the uplink information may be uplink data.

Alternatively, when downlink data is received, uplink HARQ feedback needs to be performed on the downlink data, and the uplink information may be uplink HARQ feedback information in this implementation. The uplink information includes the uplink HARQ feedback information.

In the prior art, after receiving downlink data at a current TTI, the user equipment usually performs uplink HARQ feedback on the received downlink data at a fourth TTI following the current TTI. A feedback resource used for performing uplink HARQ feedback is usually obtained according to a location of a resource occupied by the scheduling command. However, when sending uplink HARQ feedback information at a sixth TTI following the current TTI, the user equipment may conflict with another user equipment over a feedback resource used at an $(N+6)^{th}$ TTI and determined at an $(N+2)^{th}$ TTI. Therefore, to avoid a conflict over the feedback resource, the sending module 20 is further configured to send resource configuration information. The resource corresponding to the resource configuration information is a feedback resource, and the feedback resource is a resource that can be used when the uplink HARQ feedback information is sent.

In this implementation, because the user equipment can predetermine the feedback resource, different user equipments do not occupy a same feedback resource, thereby avoiding a resource conflict.

Optionally, in one embodiment, the resource configuration information includes at least one of time domain information, frequency domain information, or code domain information.

To enable the user equipment to flexibly implement uplink synchronization by using this implementation or by using the prior art, the sending module 20 is further configured to send an uplink timing advance adjustment indication, where the timing advance adjustment indication is used to indicate that the user equipment can adjust the timing advance according to the timing advance information.

That is, a function of implementing uplink synchronization according to this implementation is enabled only after the user equipment receives the timing advance adjustment indication. If the user equipment does not receive the timing advance adjustment indication, uplink synchronization can be implemented only by using the random access process.

Figure 2B:
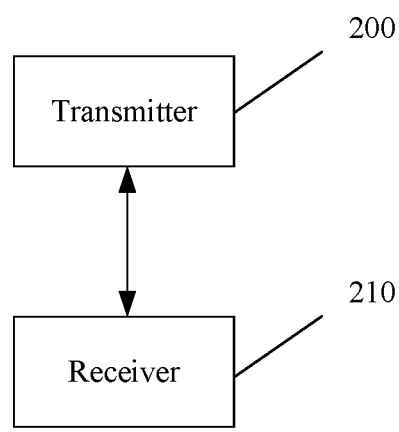
FIG. 2B is another schematic diagram of a network side device according to an embodiment of the present invention.

Referring to FIG. 2B, an embodiment of the present invention provides a network side device, and the network side device includes a transmitter 200 and a receiver 210.

The transmitter 200 is configured to send scheduling information and timing advance information, where the scheduling information is used to instruct user equipment to send uplink information, and the timing advance information is used to adjust a timing advance used when the user equipment sends the uplink information.

The receiver 210 is configured to receive the uplink information, where the uplink information is sent according to the scheduling information and the timing advance information.

In this implementation, the user equipment can implement uplink synchronization without using a random access process, that is, the user equipment can determine the timing advance information without sending a random access code. That is, the network side device does not need to send the timing advance information to the user equipment only when receiving the random access code, but can send the timing advance information in real time or according to a specific period, thereby reducing interaction of a random access code between the user equipment and the network side device. This overcomes prior-art disadvantages of a long delay and low efficiency of sending uplink data or sending an uplink HARQ feedback of downlink data.

Optionally, in one embodiment, the transmitter 200 sends the scheduling information and the timing advance information at a first transmission time interval TTI. Optionally, in a further embodiment, the receiver 210 receives the uplink information at a second TTI. The second TTI and the first TTI are separated by N TTIs, and N is greater than or equal to 0.

When sending the uplink information according to the scheduling command, the user equipment can send the uplink information by using the adjusted timing advance at the second TTI, and the user equipment is synchronized with the network side device. Certainly, the second TTI and the first TTI may be separated by any quantity of TTIs. In this implementation, the network side device can accurately receive the uplink information sent by the user equipment. Therefore, accuracy of receiving the uplink information by the network side device is improved.

Because the timing advance information is used to adjust the timing advance, the transmitter 200 is further configured to send the timing advance. The timing advance information determined by the user equipment is meaningful in this implementation. If the timing advance is not determined, determining the timing advance information is meaningless.

Further, in one embodiment, the transmitter 200 sends a MAC CE, where the MAC CE carries the timing advance information. Alternately, in another embodiment, the transmitter 200 sends physical layer control signaling, where the physical layer control signaling carries the timing advance information.

Because the MAC CE includes a 6-bit adjustment value, to avoid resource waste, the MAC CE may carry the timing advance information.

Optionally, in one embodiment, the transmitter 200 sends physical layer control signaling, where the physical layer control signaling carries the scheduling information. Optionally, in a further embodiment, the uplink information includes uplink data and/or uplink HARQ feedback information. That is, the uplink information may be uplink data. Alternatively, when downlink data is received, uplink HARQ feedback needs to be performed on the downlink data, and the uplink information may be uplink HARQ feedback information in this implementation. The uplink information includes the uplink HARQ feedback information.

In the prior art, after receiving downlink data at a current TTI, the user equipment usually performs uplink HARQ feedback on the received downlink data at a fourth TTI following the current TTI. A feedback resource used for performing uplink HARQ feedback is usually obtained according to a location of a resource occupied by the scheduling command. However, when sending uplink HARQ feedback information at a sixth TTI following the current TTI, the user equipment may conflict with another user equipment over a feedback resource used at an $(N+6)^{th}$ TTI and determined at an $(N+2)^{th}$ TTI. Therefore, to avoid a conflict over the feedback resource, the transmitter 200 is further configured to send resource configuration information, where a resource corresponding to the resource configuration information is a feedback resource, and the feedback resource is a resource that can be used when the uplink HARQ feedback information is sent.

In this implementation, because the user equipment can predetermine the feedback resource, different user equipments do not occupy a same feedback resource, thereby avoiding a resource conflict.

Optionally, in one embodiment, the resource configuration information includes at least one of time domain information, frequency domain information, or code domain information.

To enable the user equipment to flexibly implement uplink synchronization by using this implementation or by using the prior art, the transmitter 200 is further configured to send an uplink timing advance adjustment indication. The timing advance adjustment indication is used to indicate that the user equipment can adjust the timing advance according to the timing advance information.

That is, a function of implementing uplink synchronization according to this implementation is enabled only after the user equipment receives the timing advance adjustment indication. If the user equipment does not receive the timing advance adjustment indication, uplink synchronization can be implemented only by using the random access process.

Figure 3A:
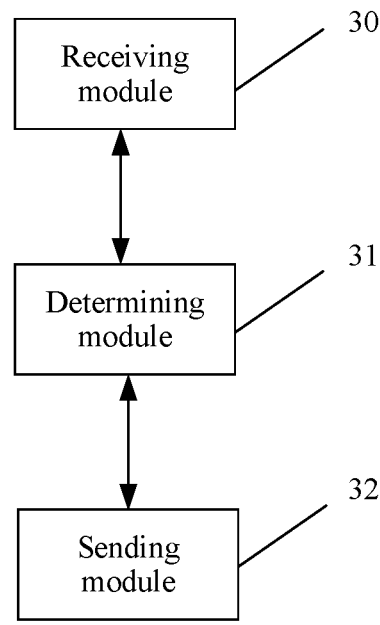
FIG. 3A is another schematic diagram of user equipment according to an embodiment of the present invention.

Referring to FIG. 3A, user equipment is provided, and the user equipment includes a receiving module 30, a determining module 31, and a sending module 32.

The receiving module 30 is configured to receive scheduling information, where the scheduling information carries uplink resource information, the uplink resource information is used to indicate a resource that can be used when uplink information is sent, and the scheduling information is used to instruct the user equipment to send the uplink information.

The determining module 31 is configured to determine that the user equipment is in an out-of-synchronization state. The sending module 32 is configured to send a random access code by using an uplink resource when the determining module 31 determines that the user equipment is in an out-of-synchronization state. The receiving module 30 is further configured to receive a random access response, where the random access response is sent according to the random access code.

After the user equipment receives the scheduling information, the user equipment cannot send the uplink information if the user equipment is in an out-of-synchronization state, but the scheduling information carries the uplink resource information. Therefore, the resource indicated by the uplink resource information may be wasted. In this implementation, the resource indicated by the uplink resource information may be used to send the random access code, so as to initiate a random access process and implement uplink synchronization. This can avoid resource waste and improve resource utilization.

In addition, in the prior art, the user equipment initiates a random access process only when uplink data arrives at the user equipment. In this implementation, when receiving the scheduling command, the user equipment initiates the random access process, and when uplink data or downlink data arrives at the user equipment, the user equipment can send the data or perform uplink HARQ feedback. Therefore, this implementation can further overcome prior-art disadvantages of a long delay and low efficiency of sending uplink data or sending an uplink HARQ feedback of downlink data.

Optionally, in one embodiment, the sending module 32 sends the random access code by using at least one target physical resource block. To specify a target physical resource block used for sending the random access code, and reduce complexity of detecting the random access code by a network side device, optionally, the target physical resource block may be implemented in the following three alternative forms. First, the target physical resource block is a physical resource block that is in the resource and whose frequency domain location is lower than a first frequency domain location that is used as a preset threshold or whose number is less than a first number that is used as a preset threshold. Alternately, the target physical resource block is a physical resource block that is in the resource and whose frequency domain location is higher than a second frequency domain location that is used as a preset threshold or whose number is greater than a second number that is used as a preset threshold. Alternately, the target physical resource block is preset.

Optionally, in one embodiment, the determining module 31 is further configured to determine random access resource information, where the random access resource information includes at least one random access code. Optionally, in one embodiment, the at least one random access code belongs to a same group.

To reduce a conflict caused when the user equipment sends the random access code, in one embodiment, the sending module 32 selects one of the at least one random access code and sends the selected random access code by using the uplink resource. Optionally, the at least one random access code includes at least one dedicated random access code.

Alternately, to reduce a conflict caused when the user equipment sends the random access code, in one embodiment, the sending module 32 selects one of the at least one dedicated random access code and sends the selected dedicated random access code by using the uplink resource.

To reuse an existing random access channel resource, a random access channel resource does not need to be introduced to the uplink resource. To reduce complexity, optionally, the random access resource information includes random access channel resource information.

The sending module 32 is further configured to send a random access code by using a random access channel resource when the determining module 31 determines that the user equipment is in an out-of-synchronization state. The random access channel resource is a channel resource indicated by the random access channel resource information.

In this way, prior-art disadvantages of a long delay and low efficiency of sending uplink data or sending an uplink HARQ feedback of downlink data are overcome. In addition, the existing random access channel resource can be reused, and the random access channel resource does not need to be introduced to the uplink resource, thereby reducing complexity.

Further, to reduce a random access conflict, optionally, the sending module 32 sends the random access code by using a random access channel resource of a TTI at which the uplink resource is located; and/or the sending module 32 sends the random access code by using the uplink resource;

and/or the sending module 32 sends the random access code by using a random access channel resource of a TTI following a TTI at which the uplink resource is located.

Optionally, the random access channel resource information is time-frequency information and/or frequency domain location information of a random access channel, or information for indicating time-frequency information and/or frequency domain location information of a random access channel.

The random access process is initiated to implement uplink synchronization, and an objective of implementing uplink synchronization is that the network side device can accurately receive the uplink information sent by the user equipment. Therefore, the sending module 32 is further configured to send the uplink information according to the random access response.

In this way, when the uplink information is sent according to the random access response, the network side device can accurately receive the uplink information.

Figure 3B:
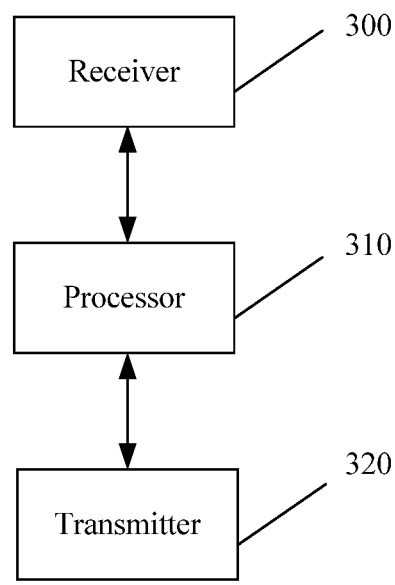
FIG. 3B is another schematic diagram of user equipment according to an embodiment of the present invention.

Referring to FIG. 3B, an embodiment of the present invention provides user equipment, and the user equipment includes a receiver 300, a processor 310, and a transmitter 320.

The receiver 300 is configured to receive scheduling information, where the scheduling information carries uplink resource information, the uplink resource information is used to indicate a resource that can be used when uplink information is sent, and the scheduling information is used to instruct the user equipment to send the uplink information.

The processor 310 is configured to determine that the user equipment is in an out-of-synchronization state. The transmitter 320 is configured to send a random access code by using an uplink resource when the processor 310 determines that the user equipment is in an out-of-synchronization state. The receiver 300 is further configured to receive a random access response, where the random access response is sent according to the random access code.

After the user equipment receives the scheduling information, the user equipment cannot send the uplink information if the user equipment is in an out-of-synchronization state, but the scheduling information carries the uplink resource information. Therefore, the resource indicated by the uplink resource information may be wasted. In this implementation, the resource indicated by the uplink resource information may be used to send the random access code, so as to initiate a random access process and implement uplink synchronization. This can avoid resource waste and improve resource utilization.

In addition, in the prior art, the user equipment initiates a random access process only when uplink data arrives at the user equipment. In this implementation, when receiving the scheduling command, the user equipment initiates the random access process, and when uplink data or downlink data arrives at the user equipment, the user equipment can send the data or perform uplink HARQ feedback. Therefore, this implementation can further overcome prior-art disadvantages of a long delay and low efficiency of sending uplink data or sending an uplink HARQ feedback of downlink data.

Optionally, in one embodiment, the transmitter 320 sends the random access code by using at least one target physical resource block.

To specify a target physical resource block used for sending the random access code, and reduce complexity of detecting the random access code by the network side device, optionally, the target physical resource block may be implemented in the following alternative three forms. First, the target physical resource block is a physical resource block that is in the resource and whose frequency domain location is lower than a first frequency domain location that is used as a preset threshold or whose number is less than a first number that is used as a preset threshold. Alternately, the target physical resource block is a physical resource block that is in the resource and whose frequency domain location is higher than a second frequency domain location that is used as a preset threshold or whose number is greater than a second number that is used as a preset threshold. Alternately, the target physical resource block is preset.

Optionally, in one embodiment, the processor 310 is further configured to determine random access resource information, where the random access resource information includes at least one random access code. Optionally, in one embodiment, the at least one random access code belongs to a same group.

To reduce a conflict caused when the user equipment sends the random access code, in one embodiment, the transmitter 320 selects one of the at least one random access code and sends the selected random access code by using the uplink resource.

Optionally, in one embodiment, the at least one random access code includes at least one dedicated random access code. To reduce a conflict caused when the user equipment sends the random access code, in one embodiment, the transmitter 320 selects one of the at least one dedicated random access code and sends the selected dedicated random access code by using the uplink resource.

To reuse an existing random access channel resource, a random access channel resource does not need to be introduced to the uplink resource. To reduce complexity, optionally, the random access resource information includes random access channel resource information.

The transmitter 320 is further configured to send a random access code by using a random access channel resource when the processor 310 determines that the user equipment is in an out-of-synchronization state. The random access channel resource is a channel resource indicated by the random access channel resource information.

In this way, prior-art disadvantages of a long delay and low efficiency of sending uplink data or sending an uplink HARQ feedback of downlink data are overcome. In addition, the existing random access channel resource can be reused, and the random access channel resource does not need to be introduced to the uplink resource, thereby reducing complexity.

Further, to reduce a random access conflict, optionally, in one embodiment, the transmitter 320 sends the random access code by using a random access channel resource of a TTI at which the uplink resource is located; and/or the transmitter 320 sends the random access code by using the uplink resource; and/or the transmitter 320 sends the random access code by using a random access channel resource of a TTI following a TTI at which the uplink resource is located.

Optionally, the random access channel resource information is time-frequency information and/or frequency domain location information of a random access channel, or information for indicating time-frequency information and/or frequency domain location information of a random access channel.

The random access process is initiated to implement uplink synchronization, and an objective of implementing uplink synchronization is that the network side device can accurately receive the uplink information sent by the user equipment. Therefore, the transmitter 320 is further configured to send the uplink information according to the random access response.

In this way, when the uplink information is sent according to the random access response, the network side device can accurately receive the uplink information.

Figure 4A:
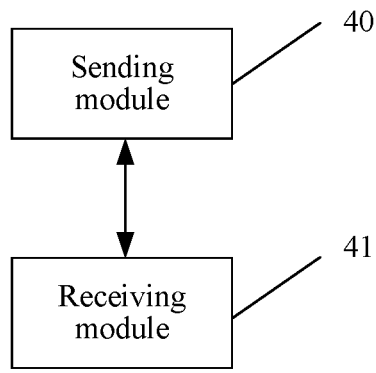
FIG. 4A is another schematic diagram of a network side device according to an embodiment of the present invention.

Referring to FIG. 4A, a network side device is provided, and the network side device includes a sending module 40 and a receiving module 41.

The sending module 40 is configured to send scheduling information, where the scheduling information carries uplink resource information, the uplink resource information is used to indicate a resource that can be used when uplink information is sent, and the scheduling information is used to instruct user equipment to send the uplink information.

The receiving module 41 is configured to receive a random access code, where the random access code is sent according to an uplink resource.

The sending module 40 is further configured to send a random access response according to the random access code.

After the user equipment receives the scheduling information sent by the network side device, the user equipment cannot send the uplink information if the user equipment is in an out-of-synchronization state, but the scheduling information carries the uplink resource information. Therefore, the resource indicated by the uplink resource information may be wasted. In this implementation, the resource indicated by the uplink resource information may be used to send the random access code received by the network side device, so as to initiate a random access process and implement uplink synchronization. This can avoid resource waste and improve resource utilization.

In addition, in the prior art, the user equipment initiates a random access process only when uplink data arrives at the user equipment. In this implementation, when receiving the scheduling command, the user equipment initiates the random access process, and when uplink data or downlink data arrives at the user equipment, the user equipment can send the data or perform uplink HARQ feedback. Therefore, this implementation can further overcome prior-art disadvantages of a long delay and low efficiency of sending uplink data or sending an uplink HARQ feedback of downlink data.

The sending module 40 is further configured to send random access resource information, where the random access resource information includes at least one random access code.

Optionally, in one embodiment, the at least one random access code belongs to a same group. In one embodiment, to reduce a random access conflict, the receiving module 41 receives one of the at least one random access code.

Optionally, in one embodiment, the at least one random access code includes at least one dedicated random access code. To reduce a random access conflict, the receiving module 41 receives one of the at least one dedicated random access code.

To reuse an existing random access channel resource, a random access channel resource does not need to be introduced to the uplink resource. To reduce complexity, optionally, the random access resource information includes random access channel resource information.

Optionally, the random access channel resource information is time-frequency information and/or frequency domain location information of a random access channel, or information for indicating time-frequency information and/or frequency domain location information of a random access channel.

The receiving module 41 is further configured to receive the uplink information.

Figure 4B:
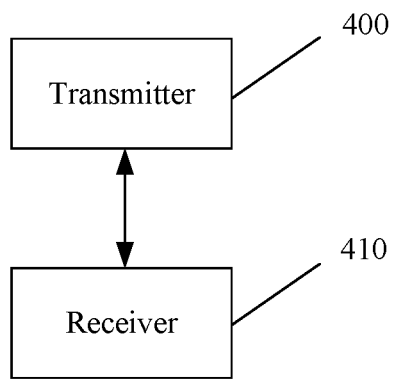
FIG. 4B is another schematic diagram of a network side device according to an embodiment of the present invention.

Referring to FIG. 4B, an embodiment of the present invention provides a network side device, and the network side device includes a transmitter 400 and a receiver 410.

The transmitter 400 is configured to send scheduling information, where the scheduling information carries uplink resource information, the uplink resource information is used to indicate a resource that can be used when uplink information is sent, and the scheduling information is used to instruct user equipment to send the uplink information.

The receiver 410 is configured to receive a random access code, where the random access code is sent according to an uplink resource.

The transmitter 400 is further configured to send a random access response according to the random access code.

After the user equipment receives the scheduling information sent by the network side device, the user equipment cannot send the uplink information if the user equipment is in an out-of-synchronization state, but the scheduling information carries the uplink resource information. Therefore, the resource indicated by the uplink resource information may be wasted. In this implementation, the resource indicated by the uplink resource information may be used to send the random access code received by the network side device, so as to initiate a random access process and implement uplink synchronization. This can avoid resource waste and improve resource utilization.

In addition, in the prior art, the user equipment initiates a random access process only when uplink data arrives at the user equipment. In this implementation, when receiving the scheduling command, the user equipment initiates the random access process, and when uplink data or downlink data arrives at the user equipment, the user equipment can send the data or perform uplink HARQ feedback. Therefore, this implementation can further overcome prior-art disadvantages of a long delay and low efficiency of sending uplink data or sending an uplink HARQ feedback of downlink data.

The transmitter 400 is further configured to send random access resource information, where the random access resource information includes at least one random access code. Optionally, in one embodiment, the at least one random access code belongs to a same group. To reduce a random access conflict, the receiver 410 receives one of the at least one random access code.

Optionally, in another embodiment, the at least one random access code includes at least one dedicated random access code. To reduce a random access conflict, the receiver 410 receives one of the at least one dedicated random access code.

To reuse an existing random access channel resource, a random access channel resource does not need to be introduced to the uplink resource. To reduce complexity, optionally, the random access resource information includes random access channel resource information.

Optionally, the random access channel resource information is time-frequency information and/or frequency domain location information of a random access channel, or information for indicating time-frequency information and/or frequency domain location information of a random access channel.

The receiver 410 is further configured to receive the uplink information.

Based on the foregoing implementation, an embodiment of the present invention further provides an uplink information sending system, and the system includes the user equipment shown in FIG. 1A or FIG. 1B and the network side device shown in FIG. 2A or FIG. 2B.

Based on the foregoing implementation, an embodiment of the present invention further provides another uplink information sending system, and the system includes the user equipment shown in FIG. 3A or FIG. 3B and the network side device shown in FIG. 4A or FIG. 4B.

Figure 5A:
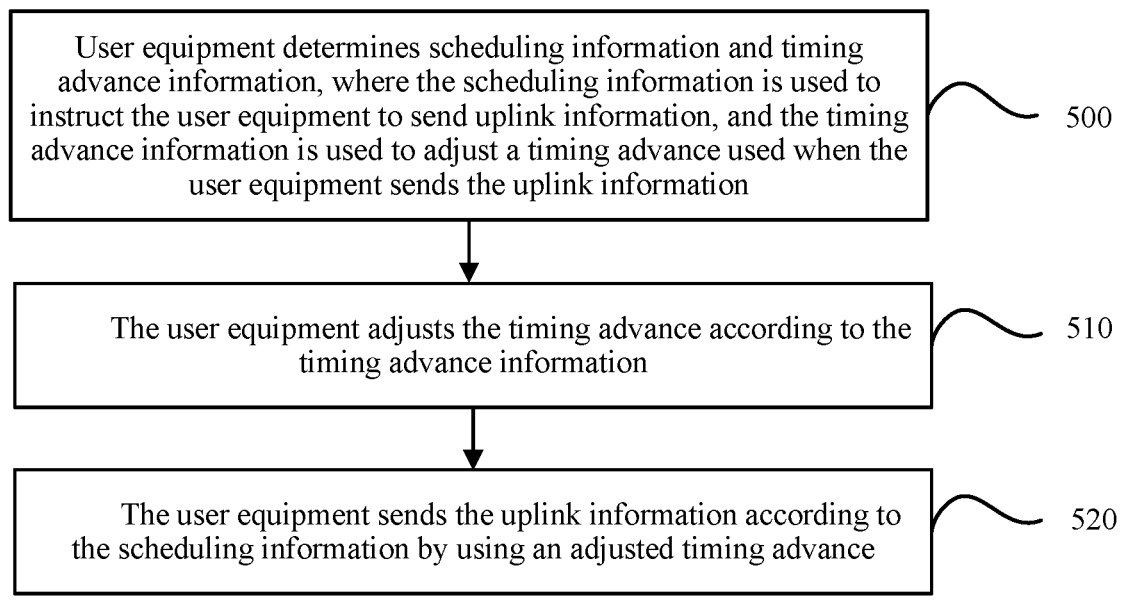
FIG. 5A is a schematic flowchart of sending uplink information according to an embodiment of the present invention.

Based on the foregoing implementation, referring to FIG. 5A, in an embodiment of the present invention, an uplink data sending procedure is as follows.

Step 500: User equipment determines scheduling information and timing advance information, where the scheduling information is used to instruct the user equipment to send uplink information, and the timing advance information is used to adjust a timing advance used when the user equipment sends the uplink information.

Step 510: The user equipment adjusts the timing advance according to the timing advance information.

Step 520: The user equipment sends the uplink information according to the scheduling information by using an adjusted timing advance.

In this embodiment of the present invention, the timing advance is used to adjust a time at which the uplink information arrives at a network side device, and an objective of the adjusting is to meet a receiving timing requirement of a network side.

In this embodiment of the present invention, a value indicated by the timing advance information may be positive, and in this implementation, the timing advance needs to be adjusted forwards. Alternatively, the value indicated by the timing advance information may be negative, and in this implementation, the timing advance needs to be adjusted afterwards. However, the adjusted timing advance is still positive regardless of whether the value indicated by the timing advance information is positive or negative. That is, regardless of how to adjust the timing advance according to the timing advance information, the uplink information sent by the user equipment needs to accurately arrive at the network side device, so that the network side device can accurately receive the uplink information.

Figure 5B:
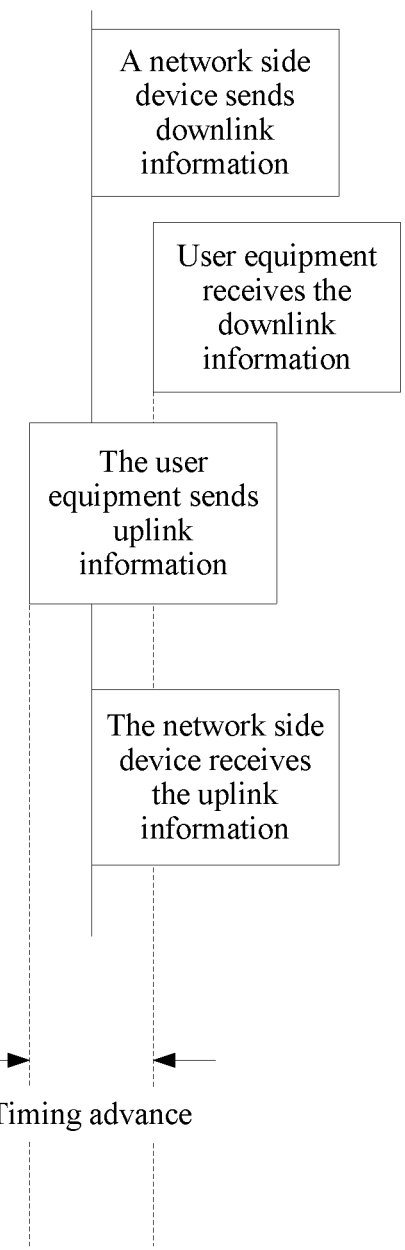
FIG. 5B is a schematic diagram in which a timing advance does not need to be adjusted according to an embodiment of the present invention.
Figure 5C:
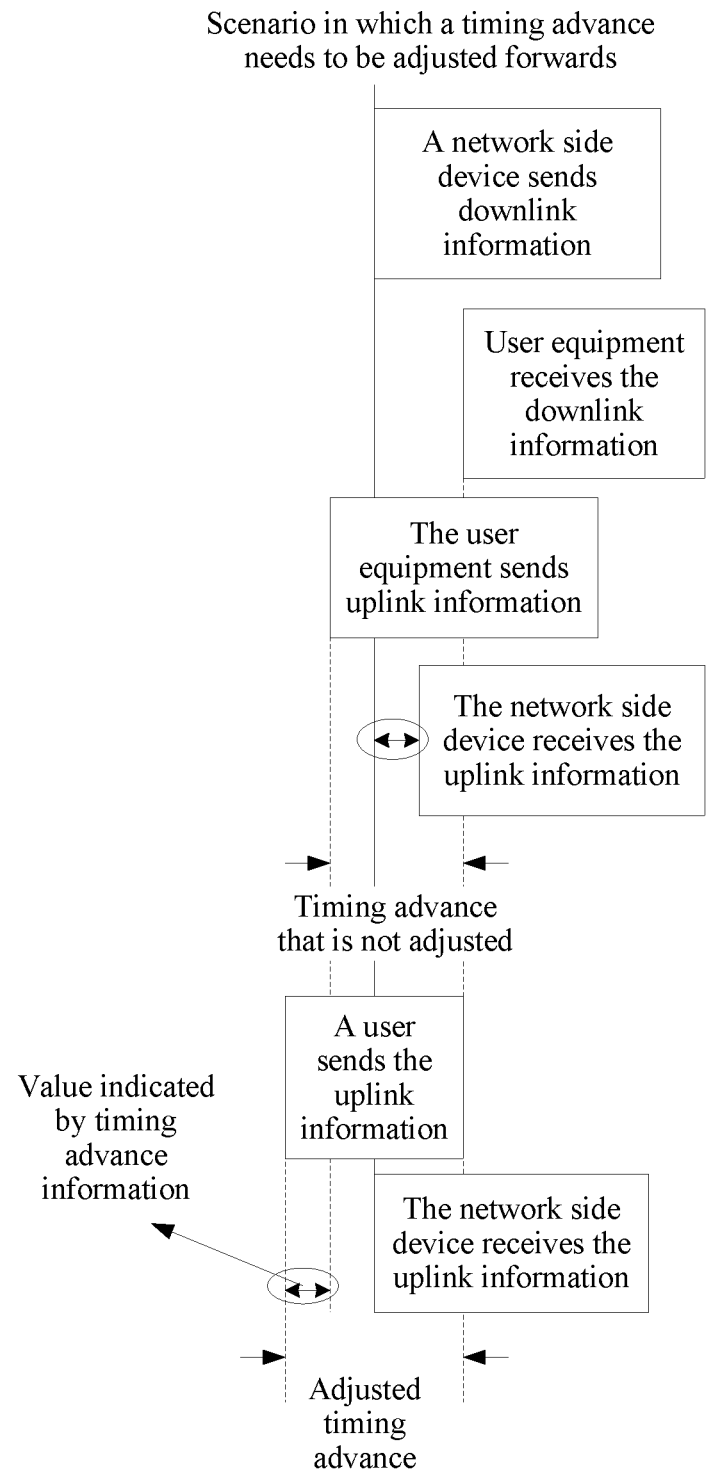
FIG. 5C is a schematic diagram in which a timing advance needs to be adjusted forward according to an embodiment of the present invention.
Figure 5D:
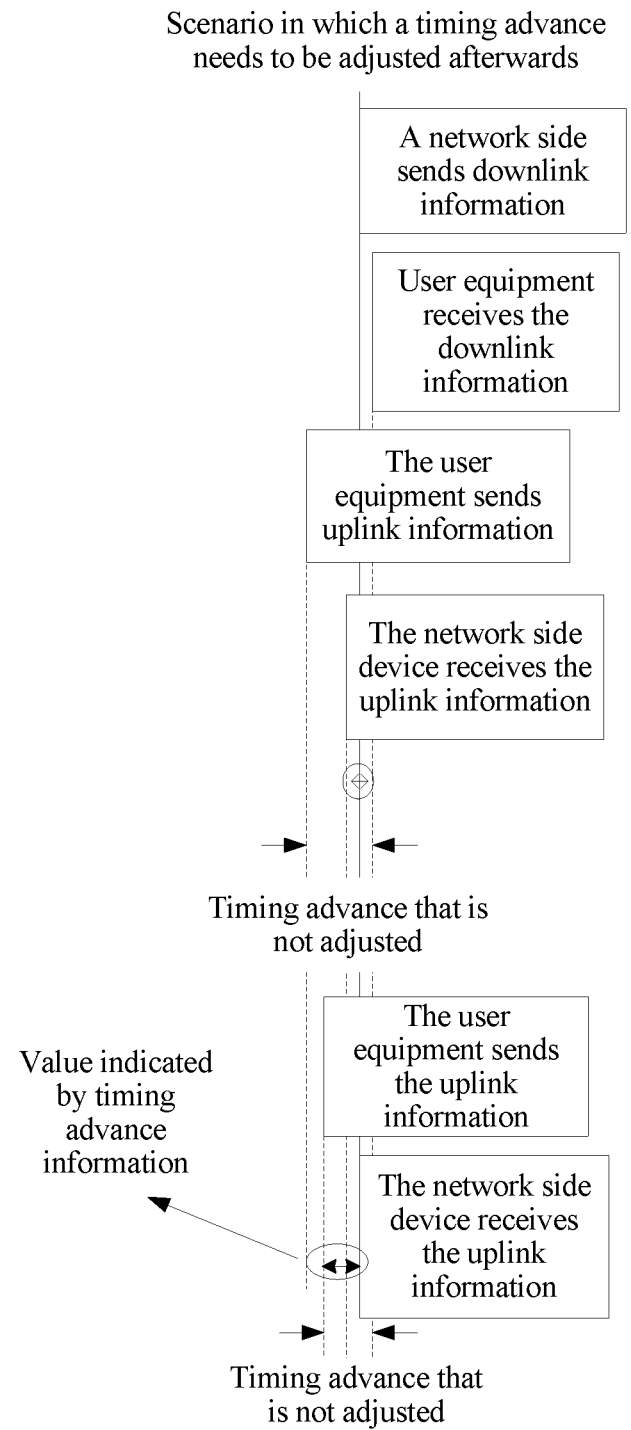
FIG. 5D is a schematic diagram in which a timing advance needs to be adjusted afterwards according to an embodiment of the present invention.

FIG. 5B depicts a schematic diagram in which the timing advance does not need to be adjusted, FIG. 5C depicts a schematic diagram in which the timing advance needs to be adjusted forwards, and FIG. 5D depicts a schematic diagram in which the timing advance needs to be adjusted afterwards. FIG. 5C depicts a scenario in which the value indicated by the timing advance information is positive, and FIG. 5D depicts a scenario in which the value indicated by the timing advance information is negative.

In this embodiment of the present invention, optionally, the user equipment may determine the scheduling information and the timing advance information in the following manner. The user equipment determines the scheduling information and the timing advance information at a first TTI.

The user equipment may determine the scheduling information and the timing advance information by using one message or by using two messages. That is, the scheduling information and the timing advance information may be carried in a same message or may be carried in different messages. This is not specifically limited herein.

In this embodiment of the present invention, optionally, the user equipment may send, in the following manner, the uplink information according to the scheduling information by using the adjusted timing advance: the user equipment sends the uplink information according to the scheduling information by using the adjusted timing advance at a second TTI. The second TTI and the first TTI are separated by N TTIs, and N is greater than or equal to 0.

When sending the uplink information according to the scheduling command, the user equipment can send the uplink information by using the adjusted timing advance at the second TTI. Therefore, the user equipment is synchronized with the network side device, so that the network side can accurately receive the uplink information sent by the user equipment.

Because the timing advance information is used to adjust the timing advance, before the user equipment adjusts the timing advance according to the timing advance information, the method further includes determining, by the user equipment, the timing advance. The determined timing advance information is meaningful in this implementation. If the timing advance is not determined, determining the timing advance information is meaningless.

In this embodiment of the present invention, optionally, the user equipment may determine the timing advance information in the following manner. The user equipment receives a MAC CE, and obtains the timing advance information from the MAC CE. Alternately, the user equipment receives physical layer control signaling, and obtains the timing advance information from the physical layer control signaling.

Because the MAC CE includes a 6-bit adjustment value, to avoid resource waste, the MAC CE may carry the timing advance information.

When the timing advance information is carried in the MAC CE, the user equipment starts, at a sixth TTI following a TTI at which the MAC CE is received, to use the timing advance information or to use the timing advance adjusted according to the timing advance information. Specifically, for example, if the TTI at which the MAC CE is received is numbered N, the user equipment may start, at a TTI numbered N+6, to use the timing advance information or to use the timing advance adjusted according to the timing advance information. Therefore, optionally, N is 6.

Alternatively, when the timing advance information is carried in the physical layer control signaling, the user equipment usually starts, at a fourth TTI following a TTI at which the timing advance information is determined, to use the timing advance information or to use the timing advance adjusted according to the timing advance information. Specifically, for example, if the TTI at which the timing advance information is determined is numbered N, the user equipment may start, at a TTI numbered N+4, to use the timing advance information or to use the timing advance adjusted according to the timing advance information. Therefore, optionally, N is 6.

Certainly, the user equipment may start, at another TTI, to use the timing advance information or to use the timing advance adjusted according to the timing advance information. This is not limited in the present invention.

In this embodiment of the present invention, optionally, the user equipment may determine the scheduling information in the following manner. The user equipment receives physical layer control signaling, and obtains the scheduling information from the physical layer control signaling.

In this embodiment of the present invention, optionally, the scheduling information is usually masked by a user identity C-RNTI (cell radio network temporary identity) and carries content including information such as a physical resource, a modulation and coding scheme, or a new data indicator allocated to the user equipment.

Optionally, the scheduling information may be an uplink grant used to instruct the user equipment to send uplink data, or may be a downlink assignment used to instruct the user equipment to receive downlink data.

In this embodiment of the present invention, optionally, the uplink information includes uplink data and/or uplink HARQ feedback information.

In this embodiment of the present invention, optionally, the uplink information includes the uplink HARQ feedback information.

In the prior art, after receiving downlink data at a current TTI, the user equipment usually performs uplink HARQ feedback on the received downlink data at a fourth TTI following the current TTI. A feedback resource used for performing uplink HARQ feedback is usually obtained according to a location of a resource occupied by the scheduling command. However, when sending uplink HARQ feedback information at a sixth TTI following the current TTI, the user equipment may conflict with another user equipment over a feedback resource used at an $(N+6)^{th}$ TTI and determined at an $(N+2)^{th}$ TTI. Therefore, to avoid a conflict over the feedback resource, before the user equipment sends the uplink information, the method further includes the following operation: determining, by the user equipment, a feedback resource that can be used when the uplink HARQ feedback information is sent.

In this implementation, optionally, the user equipment may send, in the following manner, the uplink information according to the scheduling information by using the adjusted timing advance: the user equipment sends the uplink information on the feedback resource according to the scheduling information by using the adjusted timing advance.

In this implementation, because the user equipment can predetermine the feedback resource, different user equipments do not occupy a same feedback resource, thereby avoiding a resource conflict.

In this embodiment of the present invention, optionally, the user equipment may determine, in the following manner, the feedback resource that can be used when the uplink HARQ feedback information is sent: the user equipment determines resource configuration information and uses a resource corresponding to the resource configuration information as the feedback resource.

In this embodiment of the present invention, optionally, the resource configuration information includes at least one of time domain information, frequency domain information, or code domain information.

In order that the user equipment can flexibly choose to implement uplink synchronization by using this implementation or by using a random access process, before the user equipment sends the uplink information according to the scheduling information by using the adjusted timing advance, the method further includes the following operation: receiving, by the user equipment, a timing advance adjustment indication. The timing advance adjustment indication is used to indicate that the user equipment can adjust the timing advance according to the timing advance information.

That is, a function of implementing uplink synchronization according to this implementation is enabled only after the user equipment receives the timing advance adjustment indication. If the user equipment does not receive the timing advance adjustment indication, uplink synchronization can be implemented only by using the random access process, and the timing advance can be adjusted only according to an adjustment value obtained in the random access process.

This implementation is described on the premise of a scenario in which the user equipment is in an out-of-synchronization state, that is, this implementation is meaningful only in this scenario. If the user equipment is in a synchronized state, the network side device can accurately receive the uplink information of the user equipment without using the timing advance or even the timing advance information. Therefore, before the user equipment determines the timing advance, the method further includes determining, by the user equipment, that the user equipment is in an out-of-synchronization state.

When determining the timing advance information, the user equipment may enable an alignment timer. In this implementation, the user equipment may determine that the user equipment is in an out-of-synchronization state in the following manner. When determining that the alignment timer does not expire, the user equipment determines that the user equipment is in an out-of-synchronization state.

In this implementation, the user equipment can implement uplink synchronization without using the random access process, that is, the user equipment can determine the timing advance information without sending a random access code, thereby reducing interaction of a random access code between the user equipment and the network side device. This overcomes prior-art disadvantages of a long delay and low efficiency of sending uplink data or sending an uplink HARQ feedback of downlink data.

Figure 6:
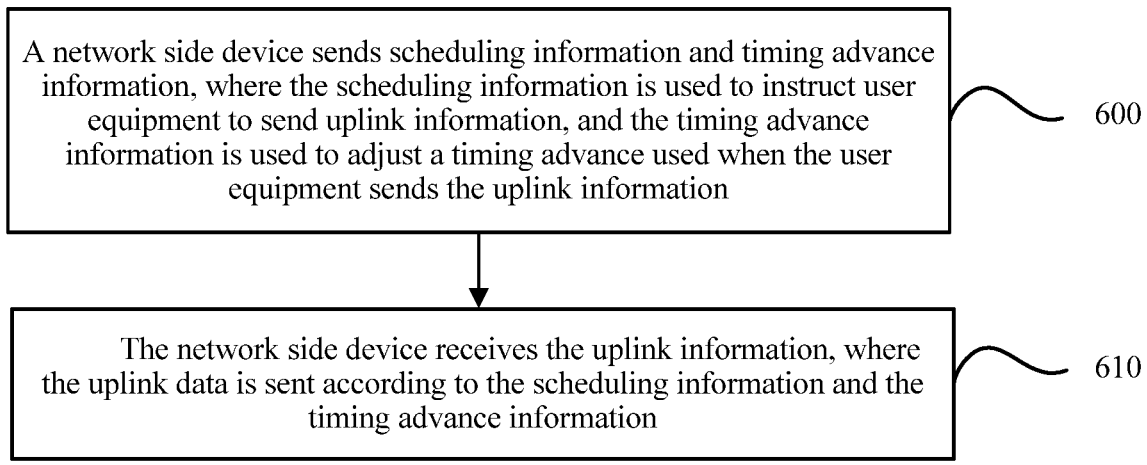
FIG. 6 is another schematic flowchart of sending uplink information according to an embodiment of the present invention.

Based on the foregoing implementation, referring to FIG. 6, in an embodiment of the present invention, another uplink data sending procedure is as follows.

Step 600: A network side device sends scheduling information and timing advance information, where the scheduling information is used to instruct user equipment to send uplink information, and the timing advance information is used to adjust a timing advance used when the user equipment sends the uplink information.

Step 610: The network side device receives the uplink information, where the uplink information is sent according to the scheduling information and the timing advance information.

In this embodiment of the present invention, the timing advance is used to adjust a time at which the uplink information arrives at the network side device, and an objective of the adjusting is to meet a receiving timing requirement of a network side.

In this embodiment of the present invention, a value indicated by the timing advance information may be positive, and in this implementation, the timing advance needs to be adjusted forwards. Alternatively, the value indicated by the timing advance information may be negative, and in this implementation, the timing advance needs to be adjusted afterwards. However, the adjusted timing advance is still positive regardless of whether the value indicated by the timing advance information is positive or negative. That is, regardless of how to adjust the timing advance according to the timing advance information, the uplink information sent by the user equipment needs to accurately arrive at the network side device, so that the network side device can accurately receive the uplink information.

FIG. 5B depicts a schematic diagram in which the timing advance does not need to be adjusted, FIG. 5C depicts a schematic diagram in which the timing advance needs to be adjusted forwards, and FIG. 5D depicts a schematic diagram in which the timing advance needs to be adjusted afterwards. FIG. 5C depicts a scenario in which the value indicated by the timing advance information is positive, and FIG. 5D depicts a scenario in which the value indicated by the timing advance information is negative.

In this embodiment of the present invention, optionally, the network side device may send the scheduling information and the timing advance information in the following manner. The network side device sends the scheduling information and the timing advance information at a first transmission time interval TTI.

The network side device may send the scheduling information and the timing advance information by using one message or by using two messages. That is, the scheduling information and the timing advance information may be carried in a same message or may be carried in different messages. This is not specifically limited herein.

In this embodiment of the present invention, optionally, the network side device may receive the uplink information in the following manner: the network side device receives the uplink information at a second TTI.

The second TTI and the first TTI are separated by N TTIs, and N is greater than or equal to 0. Because the timing advance information is used to adjust the timing advance, before the network side device receives the uplink information, the method further includes the following operation: sending, by the network side device, the timing advance.

The timing advance information determined by the user equipment is meaningful in this implementation. If the timing advance is not determined, determining the timing advance information is meaningless.

In this embodiment of the present invention, optionally, the network side device may send the timing advance information in the following manner: the network side device sends a MAC CE, where the MAC CE carries the timing advance information; or the network side device sends physical layer control signaling, where the physical layer control signaling carries the timing advance information.

Because the MAC CE includes a 6-bit adjustment value, to avoid resource waste, preferably, the MAC CE may carry the timing advance information.

In this embodiment of the present invention, optionally, the network side device may send the scheduling information in the following manner. The network side device sends physical layer control signaling, where the physical layer control signaling carries the scheduling information.

When the timing advance information is carried in the MAC CE, the user equipment starts, at a sixth TTI following a TTI at which the MAC CE is received, to use the timing advance information or to use the timing advance adjusted according to the timing advance information. Specifically, for example, if the TTI at which the MAC CE is received is numbered N, the user equipment may start, at a TTI numbered N+6, to use the timing advance information or to use the timing advance adjusted according to the timing advance information. Therefore, optionally, N is 6.

Alternatively, when the timing advance information is carried in the physical layer control signaling, the user equipment usually starts, at a fourth TTI following a TTI at which the timing advance information is determined, to use the timing advance information or to use the timing advance adjusted according to the timing advance information. Specifically, for example, if the TTI at which the timing advance information is determined is numbered N, the user equipment may start, at a TTI numbered N+4, to use the timing advance information or to use the timing advance adjusted according to the timing advance information. Therefore, optionally, N is 6.

Certainly, the user equipment may start, at another TTI, to use the timing advance information or to use the timing advance adjusted according to the timing advance information. This is not limited in the present invention.

In this embodiment of the present invention, optionally, the uplink information includes uplink data and/or uplink HARQ feedback information.

In this embodiment of the present invention, optionally, the uplink information includes the uplink HARQ feedback information.

In the prior art, after receiving downlink data at a current TTI, the user equipment usually performs uplink HARQ feedback on the received downlink data at a fourth TTI following the current TTI. A feedback resource used for performing uplink HARQ feedback is usually obtained according to a location of a resource occupied by the scheduling command. However, when sending uplink HARQ feedback information at a sixth TTI following the current TTI, the user equipment may conflict with another user equipment over a feedback resource used at an $(N+6)^{th}$ TTI and determined at an $(N+2)^{th}$ TTI. Therefore, to avoid a conflict over the feedback resource, before the network side device receives the uplink information, the method further includes the following operation: sending, by the network side device, resource configuration information, where a resource corresponding to the resource configuration information is a feedback resource, and the feedback resource is a resource that can be used when the uplink HARQ feedback information is sent.

In this implementation, because the user equipment can predetermine the feedback resource, different user equipments do not occupy a same feedback resource, thereby avoiding a resource conflict.

Optionally, the resource configuration information includes at least one of time domain information, frequency domain information, or code domain information.

To enable the user equipment to flexibly implement uplink synchronization by using this implementation or by using a random access process, before the network side device receives the uplink information, the method further includes the network side device sending an uplink timing advance adjustment indication, where the timing advance adjustment indication is used to indicate that the user equipment can adjust the timing advance according to the timing advance information.

That is, a function of implementing uplink synchronization according to this implementation is enabled only after the user equipment receives the timing advance adjustment indication. If the user equipment does not receive the timing advance adjustment indication, uplink synchronization can be implemented only by using the random access process, and the timing advance can be adjusted only according to an adjustment value obtained in the random access process.

In this implementation, the user equipment can implement uplink synchronization without using the random access process, that is, the user equipment can determine the timing advance information without sending a random access code. That is, the network side device does not need to send the timing advance information to the user equipment only when receiving the random access code, but can send the timing advance information in real time or according to a specific period, thereby reducing interaction of a random access code between the user equipment and the network side device. This overcomes prior-art disadvantages of a long delay and low efficiency of sending uplink data or sending an uplink HARQ feedback of downlink data.

Figure 7A:
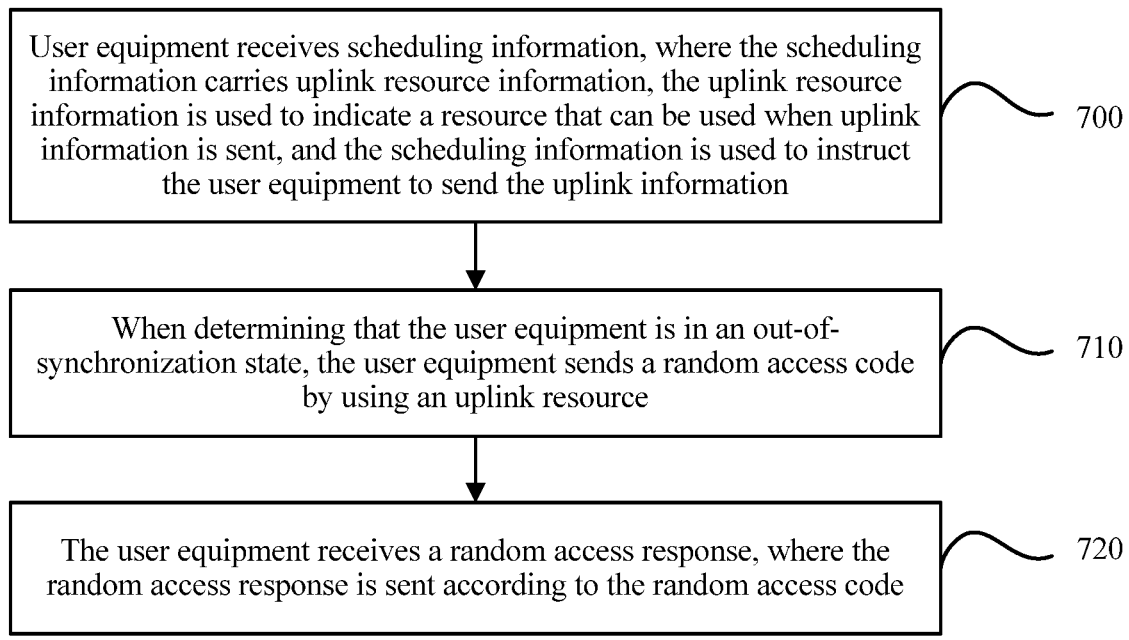
FIG. 7A is a schematic flowchart of random access according to an embodiment of the present invention.

Based on the foregoing implementation, referring to FIG. 7A, in an embodiment of the present invention, a random access procedure is as follows.

Step 700: User equipment receives scheduling information, where the scheduling information carries uplink resource information, the uplink resource information is used to indicate a resource that can be used when uplink information is sent, and the scheduling information is used to instruct the user equipment to send the uplink information.

Step 710: When determining that the user equipment is in an out-of-synchronization state, the user equipment sends a random access code by using an uplink resource.

Step 720: The user equipment receives a random access response, where the random access response is sent according to the random access code.

In this embodiment of the present invention, optionally, the user equipment may send the random access code by using the uplink resource in the following manner. The user equipment sends the random access code by using at least one target physical resource block.

To specify a target physical resource block used for sending the random access code, and reduce complexity of detecting the random access code by a network side device, optionally, the target physical resource block may be implemented in the following three alternate forms. First, the target physical resource block is a physical resource block that is in the resource and whose frequency domain location is lower than a first frequency domain location that is used as a preset threshold or whose number is less than a first number that is used as a preset threshold. Alternately, the target physical resource block is a physical resource block that is in the resource and whose frequency domain location is higher than a second frequency domain location that is used as a preset threshold or whose number is greater than a second number that is used as a preset threshold. Alternately, the target physical resource block is preset.

When the target physical resource block is the physical resource block that is in the resource and whose frequency domain location is lower than the first frequency domain location that is used as the preset threshold or whose number is less than the first number that is used as the preset threshold, optionally, the target physical resource block may be a physical resource block with a lowest frequency domain location or a physical resource block with a minimum number in the resource.

Likewise, when the target physical resource block is the physical resource block that is in the resource and whose frequency domain location is higher than the second frequency domain location that is used as the preset threshold or whose number is greater than the second number that is used as the preset threshold, optionally, the target physical resource block may be a physical resource block with a highest frequency domain location or a physical resource block with a maximum number in the resource.

In this embodiment of the present invention, before the user equipment sends the random access code by using the uplink resource, the method further includes determining, by the user equipment, random access resource information, where the random access resource information includes at least one random access code. Optionally, the at least one random access code belongs to a same group. To reduce a conflict caused when the user equipment sends the random access code, optionally, the user equipment may send, in the following manner, the random access code by using the uplink resource: the user equipment selects one of the at least one random access code and sends the selected random access code by using the uplink resource.

Optionally, the at least one random access code includes at least one dedicated random access code. To reduce a conflict caused when the user equipment sends the random access code, the user equipment may send, in the following manner, the random access code by using the uplink resource: the user equipment selects one of the at least one dedicated random access code and sends the selected dedicated random access code by using the uplink resource.

To reuse an existing random access channel resource, a random access channel resource does not need to be introduced to the uplink resource. To reduce complexity, the random access resource information further includes random access channel resource information.

As shown in FIG. 7B, the method further includes: when determining that the user equipment is in an out-of-synchronization state, sending, by the user equipment, a random access code by using a random access channel resource. The random access channel resource is a channel resource indicated by the random access channel resource information.

Optionally, the user equipment sends, in the following manner, the random access code by using the random access channel resource: the user equipment sends the random access code by using a random access channel resource of a TTI at which the uplink resource is located; and/or the user equipment sends the random access code by using the uplink resource; and/or the user equipment sends the random access code by using a random access channel resource of a TTI following a TTI at which the uplink resource is located.

Optionally, the random access channel resource information is time-frequency information and/or frequency domain location information of a random access channel, or information for indicating time-frequency information and/or frequency domain location information of a random access channel.

A random access process is initiated to implement uplink synchronization, and an objective of implementing uplink synchronization is that the network side device can accurately receive the uplink information sent by the user equipment. Therefore, after the user equipment receives the random access response, the method further includes the following operation: sending, by the user equipment, the uplink information according to the random access response.

After the user equipment receives the scheduling information, the user equipment cannot send the uplink information if the user equipment is in an out-of-synchronization state, but the scheduling information carries the uplink resource information. Therefore, the resource indicated by the uplink resource information may be wasted. In this implementation, the resource indicated by the uplink resource information may be used to send the random access code, so as to initiate the random access process and implement uplink synchronization. This can avoid resource waste and improve resource utilization.

In addition, in the prior art, the user equipment initiates a random access process only when uplink data arrives at the user equipment. In this implementation, when receiving the scheduling command, the user equipment initiates the random access process, and when uplink data or downlink data arrives at the user equipment, the user equipment can send the data or perform uplink HARQ feedback. Therefore, this implementation can further overcome prior-art disadvantages of a long delay and low efficiency of sending uplink data or sending an uplink HARQ feedback of downlink data.

Based on the foregoing implementation, referring to FIG. 8, in an embodiment of the present invention, another random access procedure is as follows.

Step 800: A network side device sends scheduling information, where the scheduling information carries uplink resource information, the uplink resource information is used to indicate a resource that can be used when uplink information is sent, and the scheduling information is used to instruct user equipment to send the uplink information.

Step 810: The network side device receives a random access code, where the random access code is sent according to an uplink resource.

Step 820: The network side device sends a random access response according to the random access code.

In this embodiment of the present invention, optionally, before the network side device receives the random access code, the method further includes the following operation: sending, by the network side device, random access resource information, where the random access resource information includes at least one random access code.

In this embodiment of the present invention, optionally, the at least one random access code belongs to a same group.

To reduce a random access conflict, in this embodiment of the present invention, optionally, the network side device may receive the random access code in the following manner: the network side device receives one of the at least one random access code.

In this embodiment of the present invention, optionally, the at least one random access code includes at least one dedicated random access code.

To reduce a random access conflict, optionally, the network side device may receive the random access code in the following manner: the network side device receives one of the at least one dedicated random access code.

To reuse an existing random access channel resource, a random access channel resource does not need to be introduced to the uplink resource. To reduce complexity, optionally, the random access resource information includes random access channel resource information.

In this embodiment of the present invention, optionally, the random access channel resource information is time-frequency information and/or frequency domain location information of a random access channel, or information for indicating time-frequency information and/or frequency domain location information of a random access channel.

A random access process is initiated to implement uplink synchronization, and an objective of implementing uplink synchronization is that the network side device can accurately receive the uplink information sent by the user equipment. Therefore, after the network side device sends the random access response according to the random access code, the method further includes the following operation: receiving, by the network side device, the uplink information.

After the user equipment receives the scheduling information sent by the network side device, the user equipment cannot send the uplink information if the user equipment is in an out-of-synchronization state, but the scheduling information carries the uplink resource information. Therefore, the resource indicated by the uplink resource information may be wasted. In this implementation, the resource indicated by the uplink resource information may be used to send the random access code received by the network side device, so as to initiate the random access process and implement uplink synchronization. This can avoid resource waste and improve resource utilization.

In addition, in the prior art, the user equipment initiates a random access process only when uplink data arrives at the user equipment. In this implementation, when receiving the scheduling command, the user equipment initiates the random access process, and when uplink data or downlink data arrives at the user equipment, the user equipment can send the data or perform uplink HARQ feedback. Therefore, this implementation can further overcome prior-art disadvantages of a long delay and low efficiency of sending uplink data or sending an uplink HARQ feedback of downlink data.

In addition, in a communications system, a wider transmission bandwidth is a key factor of improving a data transmission rate in the system. Therefore, to increase a transmission bandwidth, a CA (carrier aggregation) technology is provided. In carrier aggregation, at least two carriers are aggregated to support a wider transmission bandwidth. It is agreed that a concept of sending a PUCCH (physical uplink control channel) in an Scell (secondary cell) is added to an LTE R13 CA enhancement project.

An ACK (acknowledgement), a CSI (channel state indicator), and an SR (scheduling request) may be sent on the PUCCH carried in the Scell. Even if the PUCCH is sent in the Scell, the Scell may be deactivated.

In this way, when the user equipment configures an SR for both the Scell and a Pcell (primary cell), if the SR is triggered but the Scell is deactivated in this implementation, the user equipment cannot send the SR in the Scell. In addition, if a period of the SR configured for the Pcell is long, the user equipment needs to send the SR in the Pcell only when an SR resource in the Pcell arrives, so as to request an uplink resource. As a result, an uplink data sending delay is relatively long.

Figure 9:
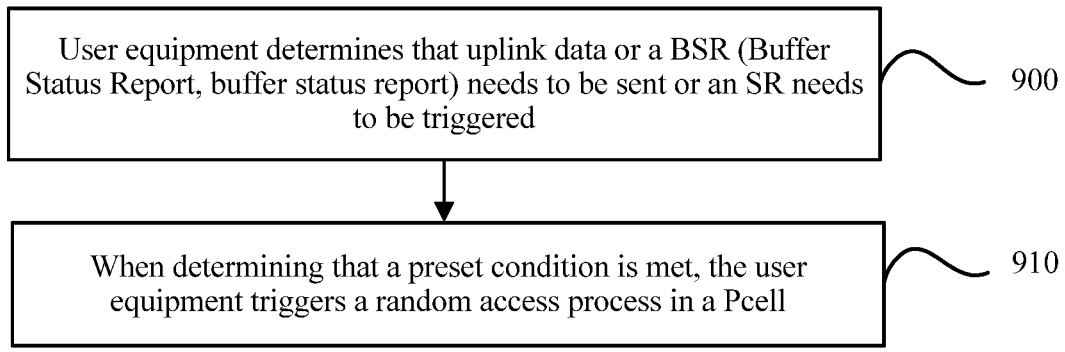
FIG. 9 is a schematic flowchart of sending uplink information according to an embodiment of the present invention.

Referring to FIG. 9, an uplink data sending method is provided below to reduce a delay of sending uplink data by user equipment.

An application scenario of the process is as follows. The user equipment determines configuration signaling, the configuration signaling includes an SR resource configured for a Pcell, and the configured SR resource in the configuration signaling of a network is used.

Step 900: The user equipment determines that uplink data or a BSR (buffer status report) needs to be sent or an SR needs to be triggered.

Step 910: When determining that a preset condition is met, the user equipment triggers a random access process in a Pcell.

According to the foregoing implementation, the uplink data or the BSR is not delayed when an SR resource in an Scell is not available, and a moment of an effective SR resource that is in the Pcell and that can be used by the user equipment is later.

Optionally, the user equipment may determine, in the following manner, that the preset condition is met. The user equipment determines that a time interval between a moment at which the uplink data or the BSR needs to be sent or a moment at which the SR needs to be triggered and the moment of the effective SR resource that is in the Pcell and that can be used by the user equipment.

Optionally, the time threshold may be 20 ms, 30 ms, or the like.

It should be noted that if the time interval is less than or equal to the time threshold, the random access process is not initiated. Instead, the configured SR resource is used to request an uplink resource for sending the uplink data.

That is, it may be determined, by determining the time interval, whether the uplink resource is requested by using the random access process or the SR resource, so as to reduce a delay of the uplink data or the BSR.

Optionally, the user equipment may determine, in the following manner, that the preset condition is met: the user equipment determines that a period of an SR resource is greater than a time threshold.

Optionally, the time threshold may be 20 ms, 40 ms, or the like.

Optionally, the user equipment may determine, in the following manner, that the preset condition is met: the user equipment determines that the uplink data or the BSR needs to be sent or the SR needs to be triggered.

It should be noted that the foregoing process describes a implementation in which the SR resource is configured, but the uplink resource is requested by using the random access process on the basis that the user equipment determines the moment at which the uplink data needs to be sent, the moment at which the BSR needs to be sent, or the moment at which the SR needs to be triggered, and there is no effective SR resource in the Scell.

There is no effective SR resource in at least one of the following implementations. The SR resource is not configured for the Scell; the SR resource is configured for the Scell but the Scell is deactivated; or the SR resource is configured for the Scell but the Scell is out of uplink synchronization.

The user equipment triggers the random access process in the Pcell, and therefore, the uplink data or the BSR is not delayed when the SR resource in the Scell is unavailable and the moment of the effective SR resource configured for the Pcell is later. Further, to avoid resource waste, after determining that the preset condition is met, the user equipment further determines whether a data amount of the uplink data reaches a data amount threshold. The random access process is initiated in the Pcell only when the data amount threshold is reached.

Optionally, the data amount threshold may be 1000 bytes, 3000 bytes, or the like.

Determining the data amount of the uplink data can reduce overheads of the uplink data or the BSR.

Optionally, before performing step 910, the user equipment further performs the following operation: receiving a random access process configuration indication, where the indication is used to enable a function of triggering the random access process in the Pcell when the user equipment determines that the preset condition is met.

That is, after the random access process configuration indication is received, the random access process is triggered in the Pcell only when the user equipment determines that the preset condition is met. If the random access process configuration indication is not received, the random access process is not triggered in the Pcell even if the user equipment determines that the preset condition is met.

Figure 10:
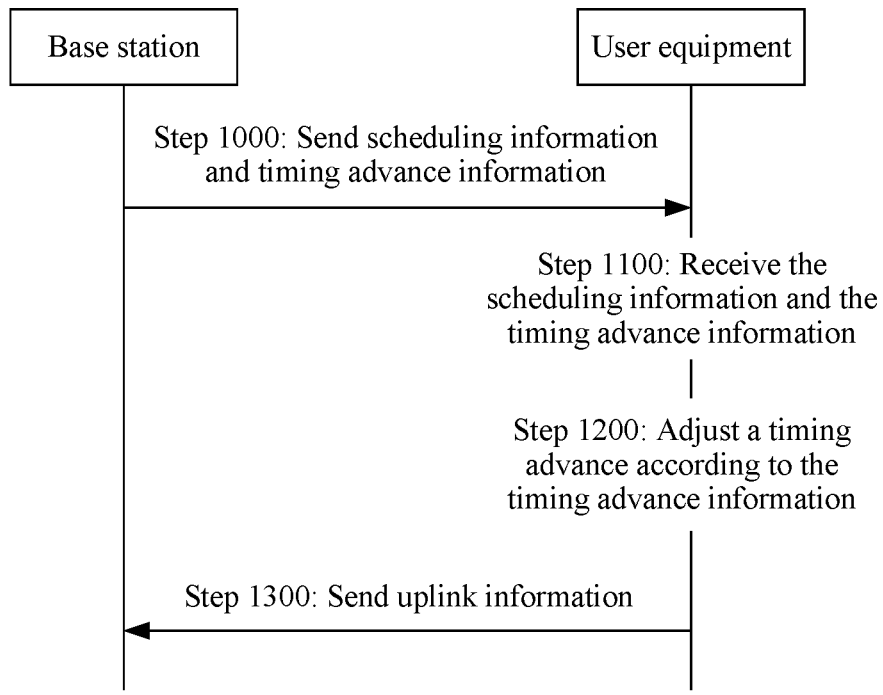
FIG. 10 is an embodiment of sending uplink information according to an embodiment of the present invention.

For ease of understanding the foregoing implementation, referring to FIG. 10, an uplink information sending embodiment is provided.

Step 1000: A base station sends scheduling information and timing advance information, where in this step, the scheduling information is used to instruct user equipment to send uplink information, and the timing advance information is used to adjust a timing advance used when the user equipment sends the uplink information.

Step 1100: The user equipment receives the scheduling information and the timing advance information.

Step 1200: The user equipment adjusts the timing advance according to the timing advance information.

Step 1300: The user equipment sends the uplink information to the base station according to the scheduling information by using an adjusted timing advance.

Figure 11:
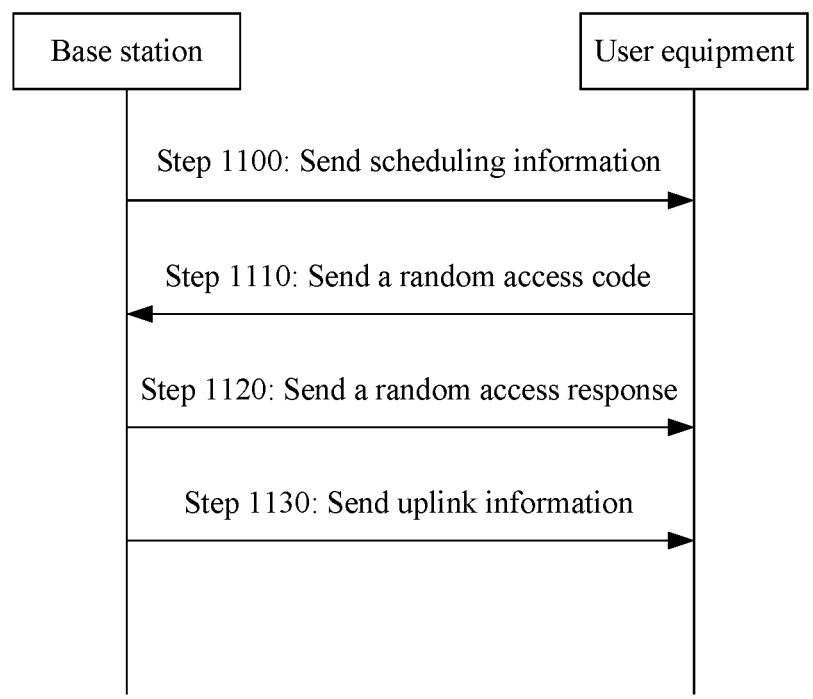
FIG. 11 is another embodiment of sending uplink information according to an embodiment of the present invention.

For ease of understanding the foregoing implementation, referring to FIG. 11, another uplink information sending embodiment is provided.

Step 1100: A base station sends scheduling information to user equipment.

In this step, the scheduling information carries uplink resource information, the uplink resource information is used to indicate a resource that can be used when uplink information is sent, and the scheduling information is used to instruct the user equipment to send the uplink information.

Step 1110: The user equipment receives the scheduling information, and when determining that the user equipment is in an out-of-synchronization state, sends a random access code to the base station by using an uplink resource.

Step 1120: The base station receives the random access code and sends a random access response to the user equipment according to the random access code.

Step 1130: The user equipment sends uplink information to the base station according to the random access response.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, a person skilled in the art can make changes and modifications to these embodiments once they learn the basic inventive concept. Therefore, the following claims are intended to be construed as to cover the embodiments and all changes and modifications falling within the scope of the present invention.

Obviously, a person skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A communication device comprising:
a processor coupled to a non-transitory memory, wherein the non-transitory memory stores execution instructions to be executed by the processor, the execution instructions, when executed by the processor, causing the communication device to:
receive a timing advance adjustment indication indicating that the communication device is allowed to adjust a timing advance according to timing advance information;
determine scheduling information and the timing advance information, wherein the scheduling information instructs the communication device to send uplink information;
adjust the timing advance according to the timing advance information in response to a determination that the communication device is in an out-of-synchronization state; and
send the uplink information according to the scheduling information using the adjusted timing advance, wherein the uplink information comprises at least one of uplink data and uplink hybrid automatic repeat request (HARQ) feedback information.

2. The communication device according to claim 1, wherein the execution instructions that cause the communication device to determine the scheduling information and the timing advance information comprise instructions for:
determining the scheduling information and the timing advance information at a first transmission time interval (TTI).

3. The communication device according to claim 2, wherein the execution instructions further include instructions that cause the communication device to:
send the uplink information according to the scheduling information using the adjusted timing advance at a second TTI, wherein the second TTI and the first TTI are separated by N TTIs, and N is greater than or equal to 0.

4. The communication device according to claim 1, wherein the execution instructions further include instructions that cause the communication device to determine the timing advance before executing the instructions to adjust the timing advance.

5. The communication device according to claim 1, wherein:
the uplink information comprises uplink HARQ feedback information;
the execution instructions further include instructions that cause the communication device to determine a feedback resource for sending the uplink HARQ feedback information before sending the uplink information; and
the execution instructions that cause the communication device to send the uplink information comprise instructions for sending the uplink information on the feedback resource according to the scheduling information using the adjusted timing advance.

6. The communication device according to claim 5, wherein the execution instructions that cause the communication device to determine the feedback resource comprise instructions for determining resource configuration information and using a resource corresponding to the resource configuration information as the feedback resource.

7. The communication device according to claim 1, wherein the execution instructions further include instructions that cause the communication device to determine that the communication device is in the out-of-synchronization state before adjusting the timing advance.

8. A network device comprising:
a processor coupled to a non-transitory memory, wherein the non-transitory memory stores execution instructions to be executed by the processor, the execution instructions, when executed by the processor, causes the network device to:
send an uplink timing advance adjustment indication indicating that user equipment is allowed to adjust a timing advance according to timing advance information;
send scheduling information and the timing advance information, wherein the scheduling information instructs the user equipment to send uplink information, and the timing advance information facilitates the user equipment adjusting, in response to a determination that the user equipment is in an out-of-synchronization state, the timing advance for sending the uplink information; and
receive the uplink information, wherein the uplink information is sent according to the scheduling information and the timing advance information, and wherein the uplink information comprises at least one of uplink data and uplink hybrid automatic repeat request (HARQ) feedback information.

9. The network device according to claim 8, wherein the execution instructions that cause the network device to send the scheduling information and the timing advance information comprise instructions for:
sending the scheduling information and the timing advance information at a first transmission time interval (TTI).

10. The network device according to claim 8, wherein the execution instructions further cause the network device to:
send the uplink timing advance adjustment indication before receiving the uplink information.

11. An uplink information sending method comprising:
receiving, by user equipment, a timing advance adjustment indication indicating that the user equipment is allowed to adjust a timing advance according to timing advance information;
determining, by the user equipment, scheduling information and the timing advance information, wherein the scheduling information instructs the user equipment to send uplink information;
adjusting, by the user equipment, the timing advance according to the timing advance information in response to determining that the user equipment is in an out-of-synchronization state; and
sending, by the user equipment, the uplink information according to the scheduling information using the adjusted timing advance, wherein the uplink information comprises at least one of uplink data and uplink hybrid automatic repeat request (HARQ) feedback information.

12. The method according to claim 11, wherein determining the scheduling information and the timing advance information comprises:

determining, by the user equipment, the scheduling information and the timing advance information at a first transmission time interval (TTI).

13. The method according to claim 12, wherein sending the uplink information comprises:

sending, by the user equipment, the uplink information according to the scheduling information using the adjusted timing advance at a second TTI, wherein the second TTI and the first TTI are separated by N TTIs, and N is greater than or equal to 0.

14. The method according to claim 11, wherein before adjusting the timing advance, the method further comprises determining, by the user equipment, the timing advance.

15. The method according to claim 11, wherein the uplink information comprises uplink HARQ feedback information, the method further comprising:

before sending the uplink information, determining, by the user equipment, a feedback resource for sending the uplink HARQ feedback information; and wherein sending the uplink information comprises sending, by the user equipment, the uplink information on the feedback resource according to the scheduling information using the adjusted timing advance.

16. The method according to claim 14, further comprising:

before determining the timing advance, determining, by the user equipment, that the user equipment is in the out-of-synchronization state.

* * * * *